(12) United States Patent
Itoh

(10) Patent No.: US 9,354,650 B2
(45) Date of Patent: May 31, 2016

(54) SWITCHING POWER SUPPLY CIRCUIT

(71) Applicant: Sharp Kabushiki Kaisha, Osaka-shi, Osaka (JP)

(72) Inventor: Hiroshi Itoh, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 572 days.

(21) Appl. No.: 13/727,315

(22) Filed: Dec. 26, 2012

(65) Prior Publication Data

US 2013/0162232 A1 Jun. 27, 2013

(30) Foreign Application Priority Data

Dec. 27, 2011 (JP) .................................. 2011-285834

(51) Int. Cl.
| | |
|---|---|
| *G05F 1/595* | (2006.01) |
| *H02M 1/088* | (2006.01) |
| *H02M 3/158* | (2006.01) |
| *H02M 1/00* | (2006.01) |

(52) U.S. Cl.
CPC .............. *G05F 1/595* (2013.01); *H02M 1/088* (2013.01); *H02M 3/158* (2013.01); *H02M 2001/0054* (2013.01); *Y02B 70/1491* (2013.01)

(58) Field of Classification Search
None
See application file for complete search history.

(56) References Cited

U.S. PATENT DOCUMENTS

| | | | | |
|---|---|---|---|---|
| 6,580,258 | B2 * | 6/2003 | Wilcox et al. | 323/282 |
| 6,614,281 | B1 | 9/2003 | Baudelot et al. | |
| 6,977,824 | B1 * | 12/2005 | Yang et al. | 363/21.16 |
| 2009/0051333 | A1 * | 2/2009 | Jo et al. | 323/235 |
| 2009/0108833 | A1 * | 4/2009 | Ziegler | 324/117 R |
| 2011/0019446 | A1 | 1/2011 | Wu et al. | |
| 2011/0227542 | A1 * | 9/2011 | Akaho | 320/145 |
| 2012/0268090 | A1 * | 10/2012 | Sasaki | 323/271 |

FOREIGN PATENT DOCUMENTS

| | | |
|---|---|---|
| CN | 201438266 U | 4/2010 |
| JP | 2004-194372 A | 7/2004 |
| JP | 2010-130881 A | 6/2010 |
| JP | 2011-142265 A | 7/2011 |
| WO | WO 03/009455 A2 | 1/2003 |

* cited by examiner

*Primary Examiner* — Timothy J Dole
*Assistant Examiner* — Monica Mata
(74) *Attorney, Agent, or Firm* — Birch, Stewart, Kolasch & Birch, LLP

(57) ABSTRACT

A switching power supply circuit includes a pair of input nodes to which an input voltage is applied, a pair of output nodes from which an output voltage is outputted and to which a load is connected, a cascode element and a coil connected between the input node and the output node, and a control circuit outputting a drive signal that controls a conduction state of the cascode element. The control circuit controls the conduction state of the cascode element in response to a potential of a point connecting a normally-on type transistor and a normally-off type transistor that constitute the cascode element.

16 Claims, 24 Drawing Sheets

SWITCHING POWER SUPPLY CIRCUIT

This nonprovisional application is based on Japanese Patent Application No. 2011-285834 filed on Dec. 27, 2011 with the Japan Patent Office, the entire contents of which are hereby incorporated by reference.

BACKGROUND OF THE INVENTION

1. Field of the Invention

The present invention relates to a switching power supply circuit, and particularly to a switching power supply circuit including a cascode element.

2. Description of the Background Art

Electrical appliances such as a television, a refrigerator and a washing machine include a power supply circuit that rectifies an AC voltage to generate a stable DC voltage or converts a DC voltage into a different DC voltage. The power supply circuit is sometimes called "converter" because of its conversion function. There are many types of the power supply circuit, such as a forward converter, a flyback converter, a boosting converter, and a stepping-down converter. These are appropriately used depending on an AC voltage, a DC voltage, a combination of voltages to be converted, and power to be handled.

Japanese Patent Laying-Open No. 2004-194372 discloses a boosting converter circuit that stores power in an output capacitor from a primary power supply through an inductor and a diode, thereby generating a boosted DC output voltage. A control circuit outputting a control signal in response to the DC output voltage controls a gate terminal of a power MOSFET controlling a current of the inductor, thereby keeping the output voltage of the boosting converter circuit constant.

Japanese Patent Laying-Open No. 2010-130881 discloses a switching power supply circuit including a PFC (Power Factor Control) circuit. A choke coil and a diode are serially connected between an output terminal of a rectification circuit and one terminal on the primary winding side of a transformer, and the PFC circuit controls a current flowing through the choke coil. The PFC circuit includes a switching element and a resistor serially connected between one terminal of an output of the rectification circuit and a point connecting the choke coil and the diode. ON/OFF of a switching element is controlled based on a potential of a point connecting the switching element and the resistor as well as an output of a flip flop circuit to which a voltage of the primary winding side of the transformer is inputted.

Japanese Patent Laying-Open No. 2011-142265 discloses a cascode-connected circuit including a normally-on type transistor and a normally-off type transistor. The normally-on type transistor is a nitride semiconductor transistor and the normally-off type transistor is a silicon semiconductor transistor. Such a configuration allows the nitride semiconductor transistor to be operated as normally off.

In the conventional switching power supply circuit, the potential of the point connecting the switching element and the resistor is fed back to the switching element, thereby controlling the current flowing through the choke coil. Since the current flowing through the choke coil flows to the resistor as well via the switching element, heat loss occurs at the resistor. This heat loss is responsible for decrease in reliability of the entire switching power supply circuit. For example, when a current of 4 Arms constantly flows through a resistor having a resistance value of 0.2Ω, heat loss caused by the resistor is 3.2 W.

In addition, the presence of such a heat generating component (resistor) makes heat release design of the entire switching power supply circuit difficult. This is because the presence of a component like an electrolytic capacitor, whose failure rate increases as the temperature increases, leads to decrease in life of the entire switching power supply circuit.

SUMMARY OF THE INVENTION

A switching power supply device according to the present invention includes: a pair of input nodes to which an input voltage is applied; a pair of output nodes from which an output voltage is outputted; a coil and a cascode element serially connected between the pair of input nodes or between a higher-potential-side input node of the pair of input nodes and a higher-potential-side output node of the pair of output nodes; and a control circuit outputting a drive signal that controls a conduction state of the cascode element. The cascode element includes a normally-on type transistor and a normally-off type transistor that are cascode-connected. The cascode element is controlled to be in a conductive state when the drive signal is in a first state, and is controlled to be in a non-conductive state when the drive signal is in a second state. The control circuit changes the drive signal from the first state to the second state in response to a midpoint potential outputted from a midpoint between the normally-on type transistor and the normally-off type transistor.

According to the present invention, the cascode element having the features of high-speed response and low loss is used as a switching element. As a result, a converter can be reduced in size and the loss of the converter can be reduced. In addition, quick abnormality detection at and protection of the switching power supply circuit can be realized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
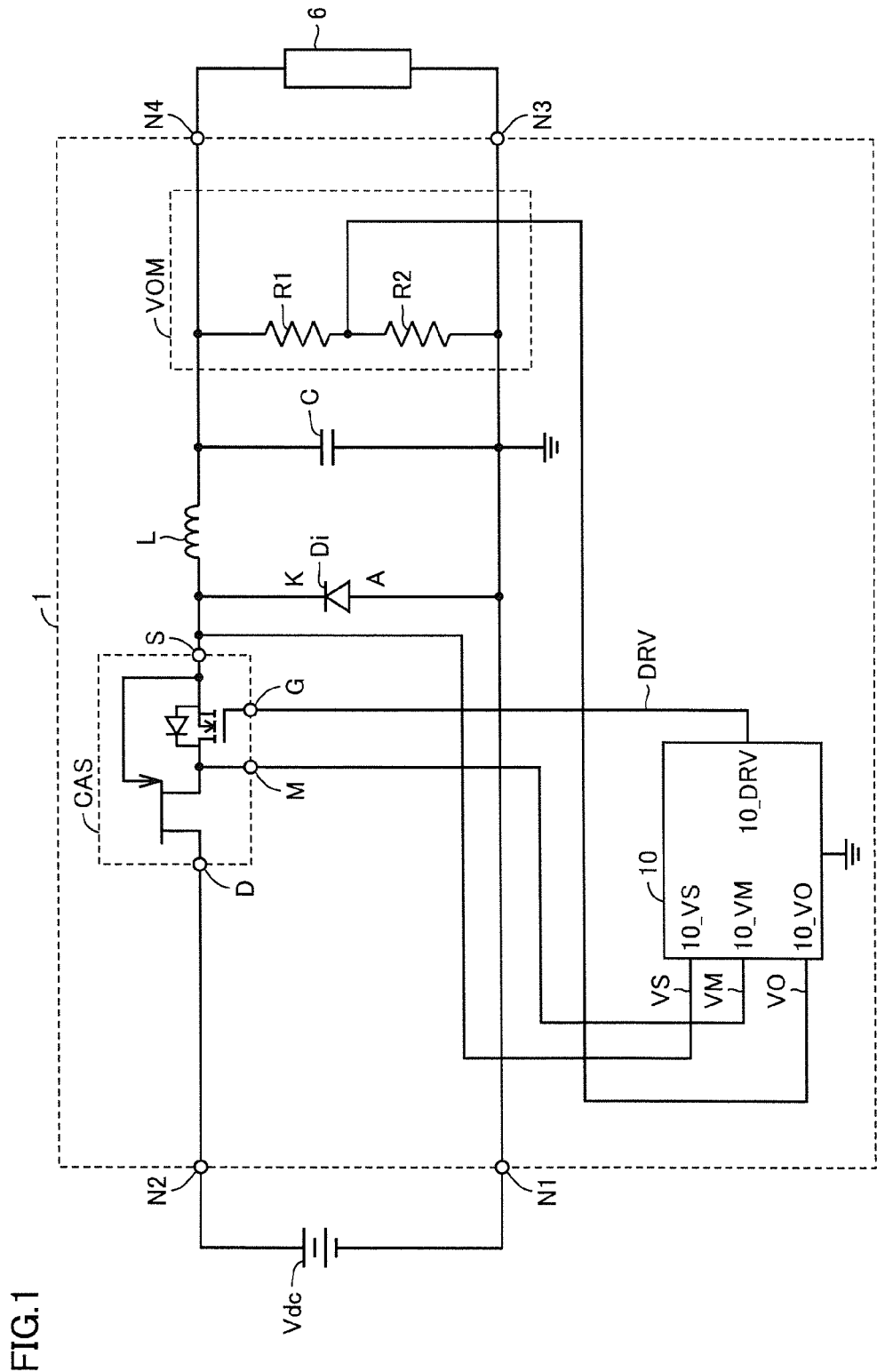
FIG. 1 is a circuit diagram of a switching power supply circuit according to a first embodiment of the present invention.

Embodiments of the present invention will be described hereinafter with reference to the drawings. When the number, an amount or the like is mentioned in the description of the embodiments, the scope of the present invention is not necessarily limited to that number, that amount or the like, unless otherwise specified. In the drawings of the embodiments, the same reference characters and the same reference numerals denote the same or corresponding portions. In addition, in the description of the embodiments, description of the portions and the like to which the same reference characters and the like are assigned will not be repeated.

<<First Embodiment>>

A circuit diagram of a switching power supply circuit 1 according to a first embodiment of the present invention will be described with reference to FIG. 1.

Switching power supply circuit 1 includes a lower-potential-side input node N1 (hereinafter also referred to as input node N1) and a higher-potential-side input node N2 (hereinafter also referred to as input node N2) to which a DC input voltage Vdc (which may also refer to a DC input power supply Vdc) is applied, as well as a lower-potential-side output node N3 (hereinafter also referred to as output node N3) and a higher-potential-side output node N4 (hereinafter also referred to as output node N4) from which a DC output voltage obtained by stepping down DC input voltage Vdc is outputted and to which a load 6 is connected. A drain terminal D of a cascode element CAS is connected to input node N2 to which DC input voltage Vdc is applied. Output node N3 is connected to a ground potential of switching power supply circuit 1.

A source terminal S of cascode element CAS is connected to one terminal of a coil L, and the other terminal of this coil L is connected to output node N4. A cathode K and an anode A of a diode Di are connected to the one terminal of coil L and output node N3, respectively. A capacitor C and an output voltage monitor circuit VOM generating an output voltage monitor signal VO (hereinafter, the characters assigned as signal names refer to values of the signals as well) are connected between output nodes N3 and N4. Output voltage monitor circuit VOM has such a configuration that a resistor R1 and a resistor R2 are serially connected between output nodes N3 and N4, and outputs a value obtained by dividing the DC output voltage as output voltage monitor signal VO from a point connecting resistor R1 and resistor R2.

Switching power supply circuit 1 further includes a control circuit 10. Control circuit 10 has an input terminal 10_VM, an input terminal 10_VS and an input terminal 10_VO, to which a midpoint potential VM outputted from a midpoint terminal M of cascode element CAS, a source potential VS outputted from source terminal S of cascode element CAS, and output voltage monitor signal VO are applied, respectively. Control circuit 10 generates a drive signal DRV based on the signals applied to the input terminals, and outputs drive signal DRV to a gate terminal G of cascode element CAS.

Switching power supply circuit 1 constitutes a stepping-down converter. As one example, a DC input voltage of 40 V is applied between input nodes N1 and N2, and a DC output voltage stepped down to 3 V is outputted between output nodes N3 and N4. It should be noted that a commercial AC power supply may be connected in some cases between input nodes N1 and N2, with a diode bridge and a line filter interposed therebetween. Output voltage monitor circuit VOM divides the DC output voltage stepped down to 3 V into a voltage of approximately 1 V, for example, and outputs the voltage as output voltage monitor signal VO.

Figure 2:
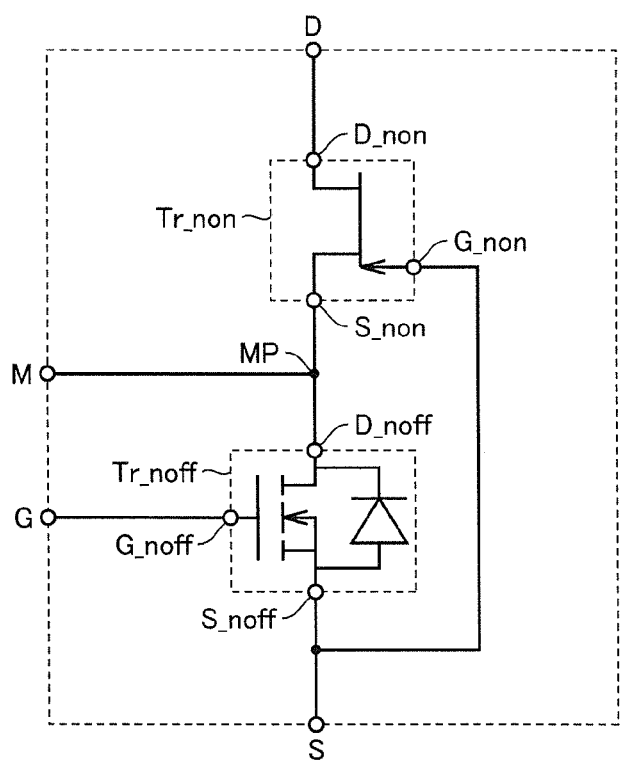
FIG. 2 is a circuit diagram of a cascode element according to the first embodiment of the present invention.

A circuit diagram of the cascode element according to the first embodiment of the present invention will be described with reference to FIG. 2.

A normally-on type transistor Tr_non is, for example, a high voltage withstand JFET (Junction Field Effect Transistor) or GaNFET (Gallium Nitride FET). A normally-off type transistor Tr_noff is a low voltage withstand SiFET (Silicon Field Effect Transistor).

The JFET or the GaNFET, which is the normally-on type transistor, is brought into conduction when a gate G_non and a source S_non have the same potential, and is brought out of conduction when a negative voltage (e.g., −1.5 V) is applied to gate G_non with respect to source S_non. In other words, normally-on type transistor Tr_non has a threshold value of −1.5 V. In this JFET or GaNFET, the on resistance, which is the resistance between a drain and a source in the on state, is small and the response speed is high, and thus, large-current and high-speed switching is possible with small loss. The SiFET, which is the normally-off type transistor, is a transistor having a positive threshold value.

Cascode element CAS in which normally-on type transistor Tr_non and normally-off type transistor Tr_noff are cascode-connected at a midpoint MP includes, as a whole, drain terminal D, gate terminal G, source terminal S, and midpoint terminal M, and operates as a transistor having a positive threshold value of normally-off type transistor Tr_noff.

Drain terminal D of cascode element CAS is connected to a drain D_non of normally-on type transistor Tr_non, gate terminal G is connected to a gate G_noff of normally-off type transistor Tr_noff, source terminal S is connected to a source S_noff of normally-off type transistor Tr_noff and a gate G_non of normally-on type transistor Tr_non, and midpoint terminal M is connected to a drain D_noff of normally-off type transistor Tr_noff and a source S_non of normally-on type transistor Tr_non.

When the potential of gate terminal G with respect to source terminal S of cascode element CAS is 0 V, cascode element CAS is turned off. At this time, normally-off type transistor Tr_noff and normally-on type transistor Tr_non are both turned off. At this time, DC input voltage Vdc of 40 V is applied to drain terminal D. When cascode element CAS is in the off state, diode Di is in the on state, and thus, the potential of source terminal S is 0 V. The potential of midpoint terminal M (i.e., midpoint MP) is 1.5 V. The potential of gate G_non with respect to source S_non when cascode element CAS is in the off state is stable at a value of around −1.5 V, which is the threshold value of normally-on type transistor Tr_non. Since gate G_non is connected to source terminal S, the potential of midpoint terminal M with respect to source terminal S is 1.5 V as described above.

When the potential of gate terminal G with respect to source terminal S of cascode element CAS is set to be the threshold value of normally-off type transistor Tr_noff or larger, normally-off type transistor Tr_noff is turned on and the potential of drain D_noff thereof becomes nearly equal to that of source terminal S. As a result, the potential of gate G_non with respect to source S_non of normally-on type transistor Tr_non becomes substantially 0 V, which is larger than the threshold value of −1.5 V. Therefore, normally-on type transistor Tr_non is brought into conduction.

As described above, cascode element CAS operates as the normally-off type transistor having the features of high voltage withstand, low on resistance and high-speed response.

A circuit diagram of control circuit 10 according to the first embodiment of the present invention will be described with reference to FIG. 3. It should be noted that signal DRV in FIG. 1 controls the potential of gate terminal G with respect to the potential of source terminal S. Therefore, strictly speaking, signal DRV is configured to be insulated with respect to the ground potential of the circuit, although the insulating configuration is omitted here to simplify the description.

Control circuit 10 is configured by a differential amplifier circuit AMP, a first protection circuit PTVM, an output voltage determination circuit VOD, an OR circuit OR10, an oscillator OSC, an inverter INV1, an NOR circuit NOR1, and a drive signal output circuit FF1.

Differential amplifier circuit AMP is a common circuit configured by an operational amplifier OPm and resistors Rm, Rs, Rg, and Rf, and midpoint potential VM and source potential VS are inputted to input terminal 10_VM and input terminal 10_VS of differential amplifier circuit AMP, respectively. Operational amplifier OPm amplifies the potential of midpoint potential VM with respect to source terminal S of cascode element CAS, and outputs the potential as a midpoint-source voltage VMS.

Midpoint-source voltage VMS is calculated as follows:

voltage $VMS = r2/r1 * (VM - VS)$ wherein r1=Rm=Rs and r2=Rf=Rg, and symbols "/" and "*" refer to division and multiplication, respectively. As indicated by the calculation formula above, midpoint-source voltage VMS is a voltage of midpoint terminal M with respect to source terminal S of cascode element CAS.

When cascode element CAS is in the off state, source potential VS with respect to a ground potential reference is 0 V and midpoint potential VM is 1.5 V. Therefore, midpoint-source voltage VMS has a voltage value obtained by multiplying 1.5 V by a coefficient of r2/r1. When cascode element CAS is in the on state, source potential VS with respect to the ground potential reference is substantially 40 V. In addition, as described below, midpoint potential VM has a value obtained by adding a voltage dependent on a current flowing through cascode element CAS to the source potential of 40V.

First protection circuit PTVM has a switch SW1, a comparator OP1 and a reference power supply Vref1.

Switch SW1 includes an input terminal A, an input terminal B, a selector terminal Se, and an output terminal. In accordance with drive signal DRV applied to selector terminal Se, a signal applied to either input terminal A or input terminal B is outputted as a midpoint-source voltage VMS1. Midpoint-source voltage VMS is applied to input terminal A and the ground potential is applied to input terminal B. Midpoint-source voltage VMS is outputted as midpoint-source voltage VMS1 when drive signal DRV is in the high level, and the ground potential is outputted as midpoint-source voltage VMS1 when drive signal DRV is in the low level.

Comparator OP1 compares midpoint-source voltage VMS1 inputted to a positive terminal thereof and reference power supply Vref1 (reference power supply Vref1 or the like also refers to an output voltage value of the power supply and the same is applied as well to the following) inputted to a negative terminal thereof, and outputs a result of comparison as a first protection signal VM10. First protection signal VM10 has binary values. First protection signal VM10 attains the high level when midpoint-source voltage VMS1 is larger than reference power supply Vref1, and attains the low level when midpoint-source voltage VMS1 is smaller than reference power supply Vref1.

Output voltage determination circuit VOD is configured by a comparator OPVO and a reference power supply Vref_VO. Comparator OPVO compares output voltage monitor signal VO inputted to a positive terminal thereof and a voltage of reference power supply Vref_VO inputted to a negative terminal thereof, and outputs a result of comparison as an output voltage control signal VOC. Output voltage control signal VOC has binary values. Output voltage control signal VOC attains the high level when output voltage monitor signal VO is larger than reference power supply Vref_VO, and attains the low level when output voltage monitor signal VO is smaller than reference power supply Vref_VO.

This output voltage monitor signal VO is a signal having a value obtained by dividing the DC output voltage of switching power supply circuit 1 with output voltage monitor circuit VOM. Using this output voltage control signal VOC, it can be detected whether the DC output voltage of switching power supply circuit 1 exceeds a predetermined set value or not. In order to keep a value of the DC output voltage constant, output voltage determination circuit VOD executes negative feedback (feedback control) using output voltage monitor signal VO.

Strictly speaking, output voltage determination circuit VOD executes P (proportional) control and I (integral) control, and calculates a proportional constant and an integral constant for a difference between a target value and output voltage monitor signal VO, and generates output voltage control signal VOC. In output voltage monitor circuit VOM shown in FIG. 3 and the figures below, a circuit diagram executing these P control, I control and the like is omitted.

Two-input OR circuit OR10 performs OR operation of first protection signal VM10 and output voltage control signal VOC, and outputs a result of operation as a drive reset signal VRST. When the DC output voltage of switching power supply circuit 1 exceeds the predetermined value, output voltage control signal VOC outputted from output voltage determination circuit VOD changes from the low level to the high level. This change is reflected in a value of drive reset signal VRST outputted from two-input OR circuit OR10.

Drive signal output circuit FF1 is an RS latch type flip flop and outputs drive signal DRV from an output terminal Q in response to a binary input signal to a set terminal S and a reset terminal R. Drive signal DRV has binary values. Drive signal DRV brings cascode element CAS into conduction when drive signal DRV attains the high level, and brings cascode element CAS out of conduction when drive signal DRV attains the low level.

The output of drive signal output circuit FF1 changes in response to a rising edge of the input signal applied to set terminal S and reset terminal R. Unless the rising edge of the input signal is inputted to set terminal S and reset terminal R, an output state (either one of the two values) of drive signal DRV outputted from output terminal Q is maintained.

An output of oscillator OSC is inputted to set terminal S via inverter INV1 and two-input NOR circuit NOR1. Based on this output of oscillator OSC, drive signal output circuit FF1 outputs drive signal DRV that brings cascode element CAS into conduction, and increases the DC output voltage of switching power supply circuit 1. This operation is performed at regular cycle intervals determined by the frequency of oscillator OSC.

Inverter INV1 and two-input NOR circuit NOR1 are circuits for preventing set terminal S and reset terminal R of drive signal output circuit FF1 from attaining the high level simultaneously. Inverter INV1 and two-input NOR circuit NOR1 give higher priority to the high level of drive reset signal VRST and cancel a rising edge of oscillator OSC at this time.

Drive reset signal VRST outputted from two-input OR circuit OR10 is inputted to reset terminal R. Drive reset signal VRST has binary values. When at least any one of first protection signal VM10 and output voltage control signal VOC changes from the low level to the high level, drive signal output circuit FF1 is reset in response to a rising edge of the signal.

The operation of resetting drive signal output circuit FF1 in accordance with output voltage control signal VOC is the operation when switching power supply circuit 1 is in the normal state. With this operation, the output voltage of switching power supply circuit 1 is controlled to be kept at a constant value. On the other hand, when an abnormality occurs at switching power supply circuit 1, drive signal output circuit FF1 is reset in accordance with first protection signal VM10. This first protection signal VM10 is generated based on midpoint potential VM outputted from midpoint terminal M of cascode element CAS.

The operation of control circuit 10 according to the first embodiment of the present invention will be described with reference to FIG. 4.

<Operation in Normal State>

FIG. 4(a) shows a waveform of drive signal DRV outputted by drive signal output circuit FF1. Drive signal output circuit FF1 outputs high-level drive signal DRV based on an output of oscillator OSC generated at time t1. High-level drive signal DRV brings cascode element CAS into conduction.

At time t2, the DC output voltage increases to 3 V or higher, which is a set value. Then, a value of output voltage monitor signal VO shown in FIG. 3 exceeds reference power supply Vref_VO and output voltage control signal VOC changes from the low level to the high level. This rising edge is transmitted to reset terminal R of drive signal output circuit FF1. Then, drive signal DRV changes from the high level to the low level and cascode element CAS is brought out of conduction.

FIG. 4(b) shows a waveform of a voltage Vds between drain terminal D and source terminal S of cascode element CAS. During a period from time t1 to time t2, a voltage of 15 V is applied to gate terminal G with respect to source terminal S of cascode element CAS, and normally-off type transistor Tr_noff and normally-on type transistor Tr_non constituting cascode element CAS are both in the conductive state, and voltage Vds between drain terminal D and source terminal S is substantially 0 V.

At time t2, cascode element CAS is brought out of conduction, and the voltage between drain terminal D and source terminal S increases to a value of around 40 V, which is a value of DC input voltage Vdc.

FIG. 4(c) shows a waveform of a coil current IL flowing through coil L. During the period from time t1 to time t2, a current flows from input node N2 of switching power supply circuit 1 into coil L via cascode element CAS. The current flowing into coil L during this period is equal to a drain current Id flowing into drain terminal D of cascode element CAS. Drain current Id increases in the manner of a straight line having a positive inclination from 10 A at time t1 to 15 A at time t2. During this period from time t1 to time t2, the DC output voltage of switching power supply circuit 1 continues increasing.

During a period from time t2 to time t3, there is no current supply from cascode element CAS to coil L. Due to energy stored in coil L, however, an anode current Ia flows from capacitor C to diode Di. A value of this anode current Ia decreases in the manner of a straight line from 15 A to 10 A.

Figure 3:
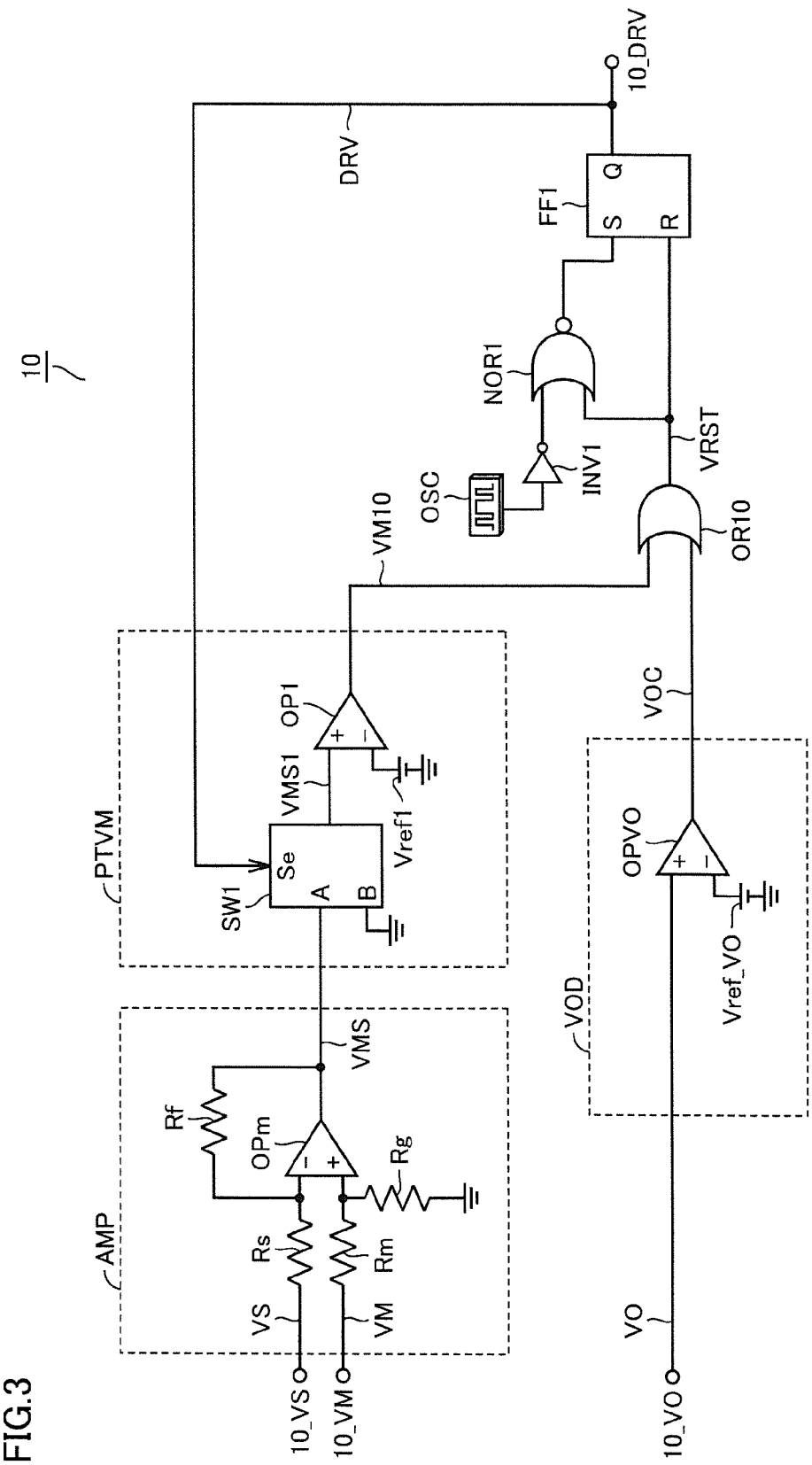
FIG. 3 is a circuit diagram of a control circuit according to the first embodiment of the present invention.

FIG. 4(d) shows a waveform of midpoint-source voltage VMS outputted by differential amplifier circuit AMP shown in FIG. 3. Midpoint-source voltage VMS represents a value of midpoint potential VM with respect to source terminal S of cascode element CAS. In other words, a result of measurement of a voltage between source S_noff and drain D_noff when drain current Id flows through normally-off type transistor Tr_noff is outputted.

When cascode element CAS is brought into conduction at time t1, the value of midpoint potential VM becomes a product of the on resistance and the drain current of normally-off type transistor Tr_noff. The on resistance is an apparent resistance value between the drain and the source when the transistor is in the on state. For example, it is assumed that the on resistance is 10 mΩ. It is also assumed that coil current IL increases from 10 A to 15 A during the period from time t1 to time t2. Since midpoint-source voltage VMS is the potential of midpoint terminal M with respect to source terminal S of cascode element CAS, midpoint-source voltage VMS increases from 100 mV (=10 mΩ*10 A) to 150 mV (=10 mΩ*15 A) during the period from time t1 to time t2.

During the period from time t2 to time t3, cascode element CAS is brought out of conduction. Therefore, midpoint-source voltage VMS has a value of around 1.5 V, which is a threshold voltage of normally-on type transistor Tr_non. During this period, coil L causes anode current Ia to flow through diode Di. This anode current Ia cannot be observed at cascode element CAS that is in the non-conductive state.

During the period from time t2 to time t3, a waveform of midpoint-source voltage VMS changing from 0.15 V to 0.1 V is shown by the broken line, separately from the actual waveform of midpoint-source voltage VMS. This waveform shown by the broken line is a waveform assumed as midpoint-source voltage VMS when aforementioned anode current Ia flows through cascode element CAS.

FIG. 4(e) shows a waveform of first protection signal VM10 outputted by first protection circuit PTVM shown in FIG. 3. In first protection circuit PTVM, high-level drive signal DRV is inputted to selector terminal Se of switch SW1. Therefore, midpoint-source voltage VMS applied to input terminal A of switch SW1 is selected and inputted to comparator OP1. Comparator OP1 compares reference power supply Vref1 (set to be 0.22 V in the first embodiment) and midpoint-source voltage VMS.

During the period from time t1 to time t2, drain current Id flows through cascode element CAS within the range assumed at the time of the normal operation. Therefore, midpoint-source voltage VMS is within the range from 0.1 V to 0.15 V, which is lower than reference power supply Vref1 of 0.22 V. Thus, first protection signal VM10 outputted by comparator OP1 is maintained at a low-level value during this period (FIG. 4(e)).

During the period from time t2 to time t3, drive signal DRV is in the low level. Therefore, switch SW1 of first protection circuit PTVM in FIG. 3 inputs the ground potential (0 V) applied to input terminal B, to comparator OP1 as midpoint-source voltage VMS1. Since reference power supply Vref1 is set to be 0.22 V, first protection signal VM10 is maintained in the low level (FIG. 4(e)).

FIG. 4(f) shows a waveform of drive reset signal VRST outputted by two-input OR circuit OR10 shown in FIG. 3. Drive reset signal VRST is obtained by performing OR operation of first protection signal VM10 and output voltage control signal VOC.

During the period from time t1 to time t2, first protection signal VM10 is maintained in the low level as described above. Output voltage control signal VOC is also maintained in the low level. This is because the DC output voltage of switching power supply circuit 1 is smaller than a predetermined value (3 V) and output voltage monitor signal VO is smaller than reference power supply Vref_Vo. Therefore, drive signal output circuit FF1 is never reset in accordance with drive reset signal VRST.

During the period from time t2 to time t3, first protection signal VM10 is maintained in the low level as described above. On the other hand, output voltage control signal VOC changes from the low level to the high level. This is because the DC output voltage of switching power supply circuit 1 exceeds the predetermined value, so that an output of comparator OPVO is inverted. Therefore, drive reset signal VRST changes from the low level to the high level, which shifts drive signal DRV to the low level.

<Operation when Abnormality is Detected>

The operation of control circuit 10 when an abnormality is detected during a period from time t3 to time t4 will be described with reference to FIG. 4.

As shown in FIG. 4(a), at time t3, the level of drive signal DRV changes from the low level to the high level based on the output of oscillator OSC. A case is now assumed, where short circuit occurs in load 6 connected between the output nodes of switching power supply circuit 1 or coil L is saturated due to heat generation at time ts.

As shown in FIG. 4(c), due to the short circuit in load 6 or the heat generation of the coil, drain current Id of cascode element CAS increases sharply after time ts.

As shown in FIG. 4(d), the sharp increase in drain current Id starting at time ts results in an increase in midpoint potential VM shown in FIG. 3. As a result, a value of midpoint-source voltage VMS outputted by differential amplifier circuit AMP increases sharply as well. During the period from time t1 to time t2 in which the operation is normal, the value of midpoint-source voltage VMS is within the range from 0.1 V to 0.15 V. The value of midpoint-source voltage VMS, however, increases sharply after time ts and reaches 0.22 V at time te.

Since drive signal DRV is set to be in the high level after time t3, switch SW1 of first protection circuit PTVM shown in FIG. 3 selects midpoint-source voltage VMS and outputs midpoint-source voltage VMS to comparator OP1.

As shown in FIG. 4(e), first protection signal V10 changes from the low level to the high level at time te. When midpoint-source voltage VMS exceeds reference power supply Vref1 at time te, first protection circuit PTVM shown in FIG. 3 changes the level of first protection signal VM10 from the low level to the high level.

As shown in FIG. 4(f), at time te, first protection signal V10 changes to the high level. Then, drive reset signal VRST also changes from the low level to the high level. As a result, drive signal output circuit FF1 is reset. Since drive signal output circuit FF1 operates in response to the rising pulse inputted to set terminal S and reset terminal R, signal DRV changes to the low level in accordance with protection signal VM10 generated in the pulsed manner. Signal DRV is maintained in the low level until the next output of oscillator OSC is inputted. As a result, although drive signal DRV should be reset at time t4 in the normal state, drive signal DRV is reset at time te prior to time t4 due to abnormality detection.

As shown in FIG. 4(a), at time te, drive reset signal VRST changes to the high level. Then, drive signal output circuit FF1 shown in FIG. 3 is reset and drive signal DRV is lowered from the high level to the low level.

As shown in FIG. 4(b), at time te, drive signal DRV is lowered to the low level. Then, cascode element CAS shown in FIG. 1 is brought out of conduction and the voltage between source terminal S and drain terminal D increases to approximately 40 V close to DC input voltage Vdc.

As shown in FIG. 4(c), at time te, cascode element CAS is brought out of conduction. Then, energy supply from DC input power supply Vdc to coil L stops.

Figure 4:
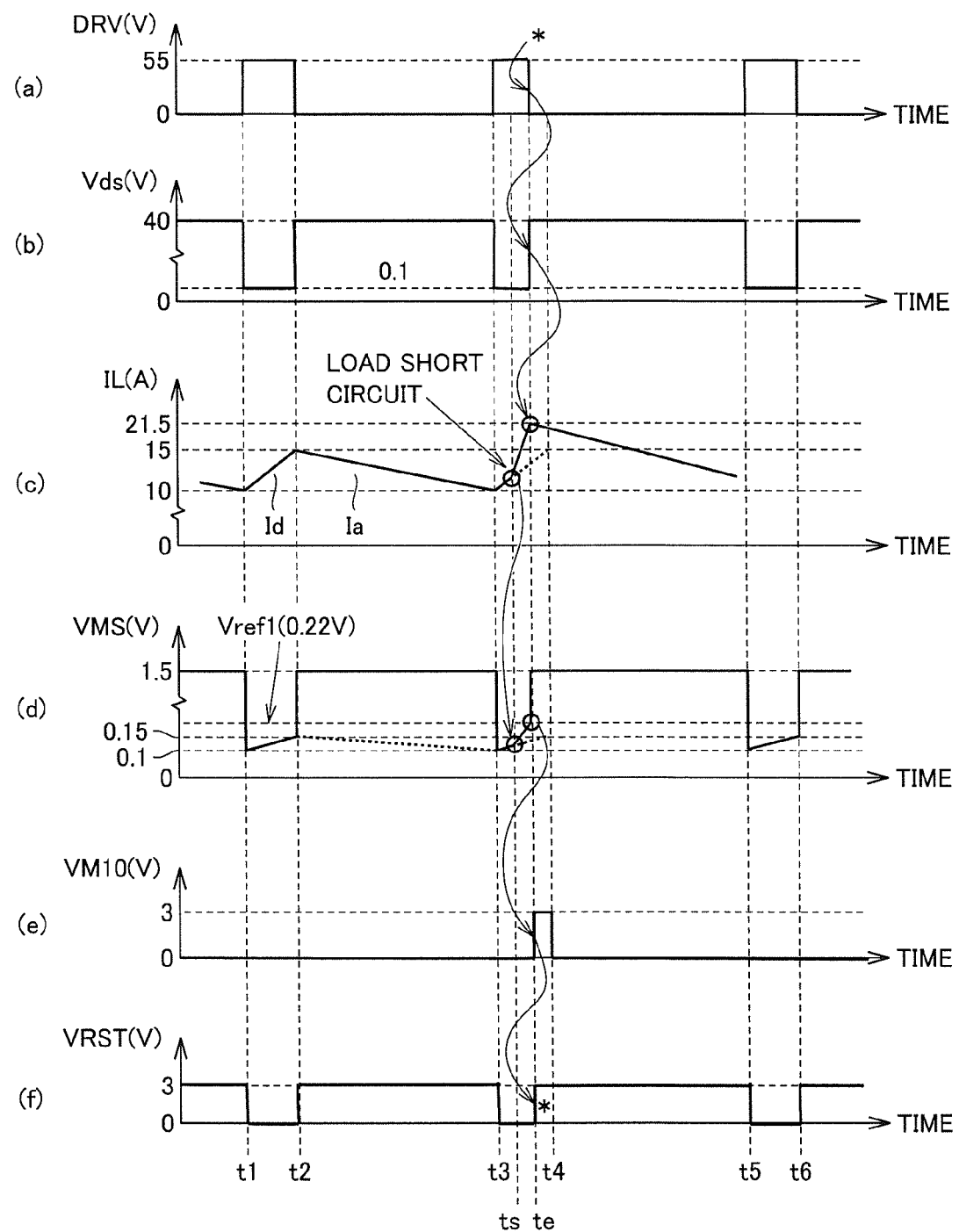
FIG. 4 is a timing chart showing the operation of the control circuit according to the first embodiment of the present invention.

Since the signals shown in FIG. 4 are processed by an analog circuit and a digital circuit, a delay occurs among the signals due to these circuits and the like. However, in order to simplify the description, the signals shown in FIGS. 4(a) to 4(f) are described as changing at the same time. This simplified expression is applied as well to the other timing charts describing the operation of the control circuit.

As described above, the abnormal increase in coil current IL caused by the load short circuit and the like is detected as midpoint potential VM of cascode element CAS, and is transmitted to drive signal output circuit FF1 by first protection signal VM10 outputted by first protection circuit PTVM. In response to this, drive signal output circuit FF1 forcibly brings cascode element CAS, which is in the conductive state, out of conduction, and thus, load 6 and switching power supply circuit 1 are protected.

Cascode element CAS operates as a switching element having the features of high-speed response and low loss. The cascode element having the high-speed response performance allows the switching speed to have a higher frequency. As a result, reduction in size of the coil, and further, reduction in size and weight of the converter can be achieved. In addition, cascode element CAS having the low loss performance eliminates the need for the resistor for abnormal current detection that has been conventionally required, and thus, the loss at the converter can be reduced.

The operation of control circuit 10 when an abnormality occurs at coil current IL at time ts has been described with reference to FIG. 4. Even after time t6, abnormalities may occur at coil current IL several times. In such a case as well, control circuit 10 detects the occurrence of these abnormalities based on midpoint potential VM and the operation of protecting load 6 and switching power supply circuit 1 is performed.

<<First Modification of First Embodiment>>

A circuit diagram of a control circuit 11 according to a first modification of the first embodiment of the present invention will be described with reference to FIG. 5.

Control circuit 11 is configured by differential amplifier circuit AMP, a second protection circuit PTVMa, output voltage determination circuit VOD, an OR circuit OR11, oscillator OSC, inverter INV1, NOR circuit NOR1, drive signal output circuit FF1, and a switch control circuit FF2.

Switch control circuit FF2 is an RS latch type flip flop and outputs a switch control signal DRV2 from an output terminal Q in response to a binary input signal to a set terminal S and a reset terminal R. An output signal of NOR circuit NOR1 and drive reset signal VRST are inputted to set terminal S and reset terminal R, respectively.

The configurations of differential amplifier circuit AMP, output voltage determination circuit VOD, oscillator OSC, inverter INV1, NOR circuit NOR1, and drive signal output circuit FF1 are the same as those in control circuit 10 according to the first embodiment shown in FIG. 3, and thus, description of the configurations and operation will not be repeated.

Second protection circuit PTVMa differs from first protection circuit PTVM shown in FIG. 3 in that comparison between midpoint-source voltage VMS and the reference voltage is made not only during the period in which drive signal DRV is in the high level but also during the period in which drive signal DRV is in the low level.

Second protection circuit PTVMa has switch SW1 and a switch SW2, each of which includes input terminal A, input terminal B, selector terminal Se, and the output terminal. During a period in which the high level is applied to selector terminal Se, switches SW1 and SW2 output a value of midpoint-source voltage VMS inputted to input terminal A as midpoint-source voltages VMS1 and VMS2, respectively. During a period in which the low level is applied to selector terminal Se, switches SW1 and SW2 output a ground potential inputted to input terminal B as midpoint-source voltages VMS1 and VMS2, respectively.

Switch control signal DRV2 is applied to selector terminal Se of switch SW1 and switch control signal DRV2 inverted by an inverter INVSW is applied to selector terminal Se of switch SW2. In other words, midpoint-source voltage VMS is outputted from switch SW1 during a period in which switch control signal DRV2 is in the high level, and midpoint-source voltage VMS is outputted from switch SW2 during a period in which switch control signal DRV2 is in the low level.

In control circuit 10 according to the first embodiment shown in FIG. 3, first protection circuit PTVM is controlled in accordance with drive signal DRV outputted from drive signal output circuit FF1. In contrast, control circuit 11 according to the first modification of the first embodiment has switch control circuit FF2 controlling second protection circuit PTVMa, separately from drive signal output circuit FF1 controlling the conduction state of cascode element CAS.

Values of midpoint-source voltages VMS1 and VMS2 are compared with reference power supplies Vref1 and Vref2 in comparators OPS1 and OPS2, respectively. Voltage values of reference power supplies Vref1 and Vref2 are both set to be 0.22 V. These values are values obtained by adding an allowance to 0.15 V, which is a maximum value of midpoint-source voltage VMS detected by cascode element CAS when switching power supply circuit 1 operates normally.

Comparators OPS1 and OPS2 output midpoint-source voltages VMS1 and VMS2 having binary values, respectively. An OR circuit ORSW performs OR operation of midpoint-source voltages VMS1 and VMS2 to generate a second protection signal VM11, and outputs second protection signal VM11 to OR circuit OR11. Second protection signal VM11 is outputted from second protection circuit PTVMa.

The operation of control circuit 11 according to the first modification of the first embodiment of the present invention will be described with reference to FIG. 6.

<Operation in Normal State>

Figure 6:
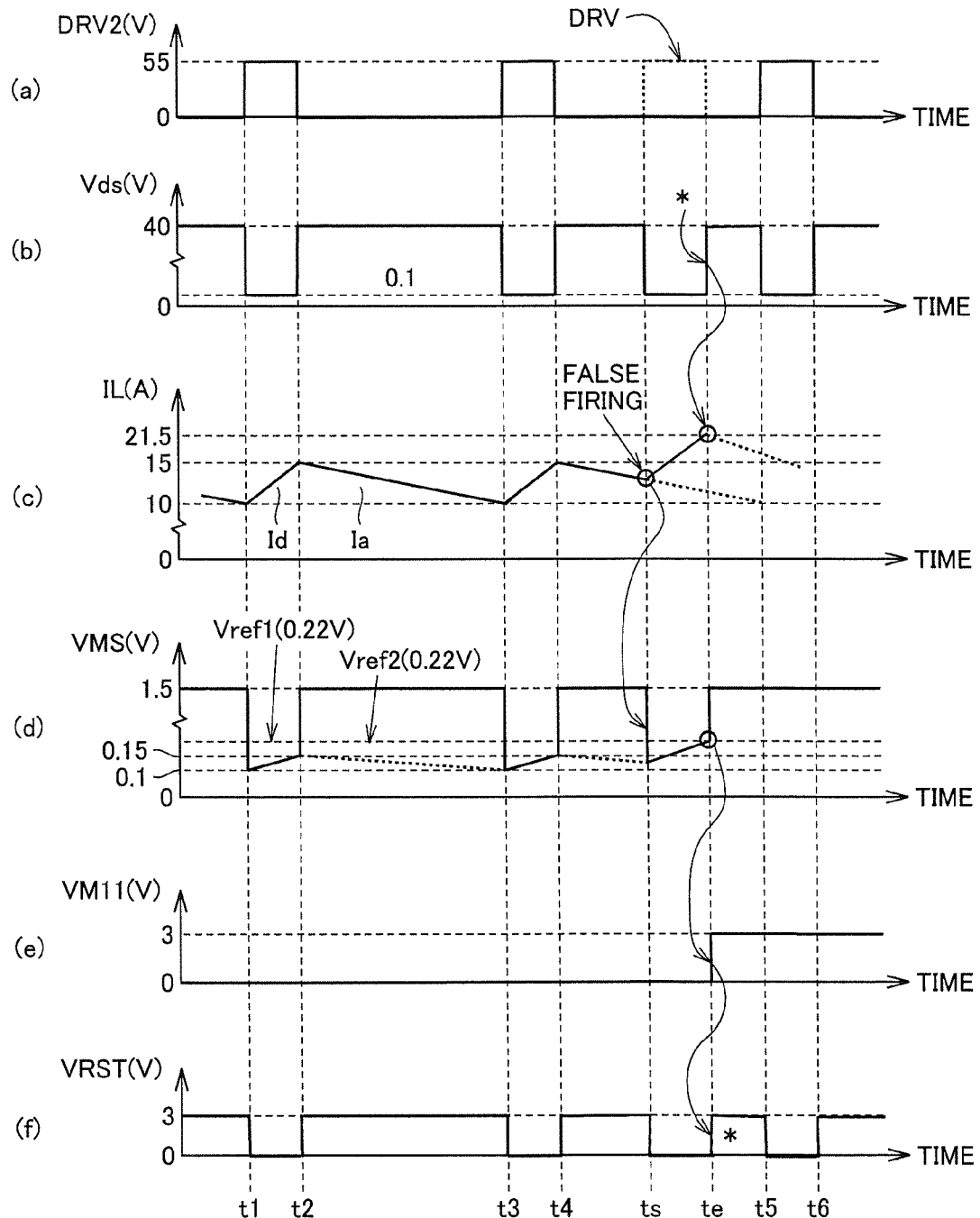
FIG. 6 is a timing chart showing the operation of the control circuit according to the first modification of the first embodiment of the present invention.

Change in the signals in FIG. 6 during the period from time t1 to time t2 in which cascode element CAS is in the conductive state and during the period from time t2 to time t3 in which cascode element CAS is in the non-conductive state is the same as the corresponding change in the signals in FIG. 4, and thus, description thereof will not be repeated.

<Operation When Abnormality is Detected>

The operation of control circuit 11 when an abnormality is detected during a period from time ts to time te will be described with reference to FIG. 6. For example, a case where cascode element CAS is turned on by mistake due to noise and the like is assumed as the abnormal state of switching power supply circuit 1.

As shown in FIG. 6(a), at time t4, drive signal DRV changes from the high level to the low level. This is because the DC output voltage of switching power supply circuit 1 exceeds the predetermined value (3 V), and thus, output voltage control signal VOC shown in FIG. 5 changes from the low level to the high level.

As shown in FIG. 6(c), after time t4, cascode element CAS is brought out of conduction and current supply from DC input power supply Vdc to coil L stops. Then, coil current IL decreases. At time ts when cascode element CAS is in the non-conductive state, false firing occurs (in FIG. 6(a), drive signal DRV shown by the broken line changes from the low level to the high level), and coil current IL increases to 21.5 A at time te. On the other hand, midpoint-source voltage VMS is selected by switch SW2 shown in FIG. 5 and inputted to comparator OPS2 in accordance with switch control signal DRV2 maintained in the low level.

Figure 5:
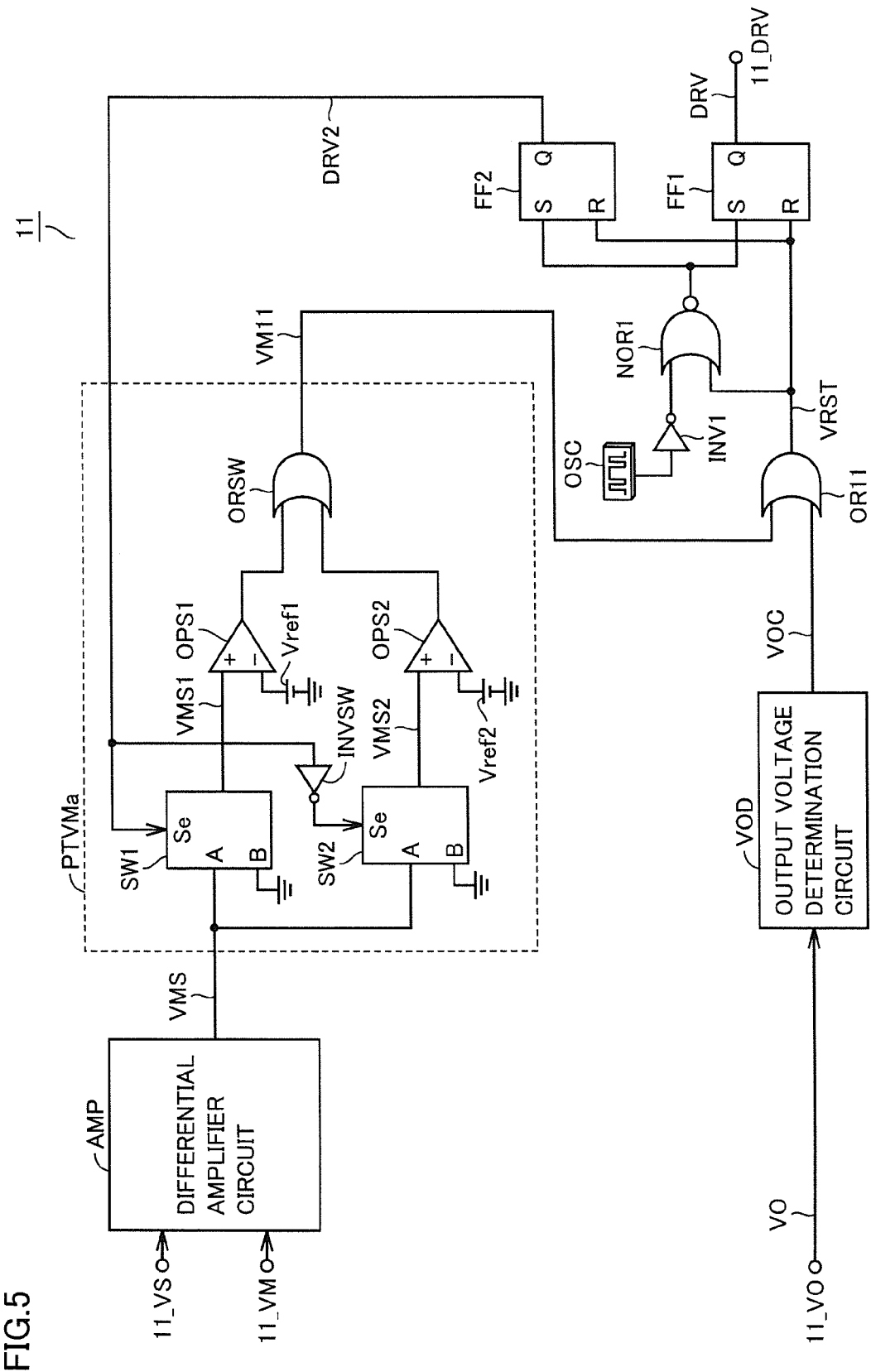
FIG. 5 is a circuit diagram of a control circuit according to a first modification of the first embodiment of the present invention.

Cascode element CAS is arranged apart from drive signal output circuit FF1 shown in FIG. 5. As a result, drive signal DRV is long and is easily affected by noise. On the other hand, switch control circuit FF2 and second protection circuit PTVMa are included in control circuit 11, and thus, switch control signal DRV2 is not easily affected by noise as compared with drive signal DRV. Therefore, the abnormal operation during the period in which cascode element CAS is in the non-conductive state can be detected by switch control circuit FF2 and second protection circuit PTVMa, and the protection operation can be performed.

As shown in FIG. 6(d), at time te, comparator OPS2 compares midpoint-source voltage VMS and reference power supply Vref2, and changes second protection signal VM11 from the low level to the high level through OR circuit ORSW. As a result of this change in the signal, drive reset signal VRST changes from the low level to the high level, and drive signal output circuit FF1 changes drive signal DRV to the low level and brings cascode element CAS out of conduction.

In switching power supply circuit 1 according to the first modification of the first embodiment, an abnormality in switching power supply circuit 1 is detected and the system is protected even during the period in which the cascode element is in the non-conductive state.

The operation when an abnormality occurs one time at time ts has been described with reference to FIG. 6 to simplify the description. Assuming that the false operation caused by noise occurs repeatedly, the number of times of occurrence of abnormalities like at time ts may be counted and the entire system may be stopped as a failure mode when the abnormalities occur more than the certain number of times.

It is now assumed that the system refers to, for example, a liquid crystal television and switching power supply circuit I supplies power to a backlight and a liquid crystal panel of the liquid crystal television. The liquid crystal television separately includes a stand-by power-saving power supply and power is supplied to a system microcomputer controlling the liquid crystal television. The system microcomputer manages occurrence of an abnormality at the entire liquid crystal television and locks the liquid crystal television to prevent the liquid crystal television from operating when an abnormality occurs at switching power supply circuit 1. The abnormality in the liquid crystal television is displayed for the user by an LED and the like provided at a main body thereof, and the user is notified of the necessity for repair.

<<Second Modification of First Embodiment>>

A circuit diagram of a control circuit 12 according to a second modification of the first embodiment of the present invention will be described with reference to FIG. 7.

Control circuit 12 is configured by differential amplifier circuit AMP, first protection circuit PTVM, output voltage determination circuit VOD, an OR circuit OR12, oscillator OSC, inverter INV1, NOR circuit NOR1, drive signal output circuit FF1, and a hold circuit HOLD. The configurations of the circuits other than hold circuit HOLD in control circuit 12 are the same as those in control circuit 10 according to the first embodiment shown in FIG. 3, and thus, description of the configurations and operation will not be repeated.

Hold circuit HOLD is configured by a flip flop circuit SR and a timer TMR. When a high-level first protection signal VM12 (hereinafter may also be referred to as a flag signal FLG) is inputted to an input terminal S of flip flop circuit SR, flip flop circuit SR outputs a high-level lock signal (LOCK) from an output terminal (not shown) in response to the rising signal. This operation maintains the lock signal (LOCK) in the high level until a rising pulse is inputted to a reset terminal R.

After a predetermined time (e.g., three seconds) has elapsed since lock signal LOCK was inputted, timer TMR outputs a reset signal RST to flip flop circuit SR. When reset signal RST is inputted to reset terminal R of flip flop circuit SR, flip flop circuit SR changes lock signal LOCK from the high level to the low level.

In other words, when high-level first protection signal VM12 (flag signal FLG) is inputted, hold circuit HOLD continues outputting high-level lock signal LOCK for the predetermined time (three seconds). After the predetermined time elapses, lock signal LOCK changes from the high level to the low level. With this hold circuit, the period in which drive signal output circuit FF1 is reset in accordance with first protection signal VM12 (the period in which cascode element CAS is in the non-conductive state) can be retained for the predetermined time.

The operation of control circuit 12 according to the second modification of the first embodiment of the present invention will be described with reference to FIG. 8.

<Operation in Normal State>

Figure 8:
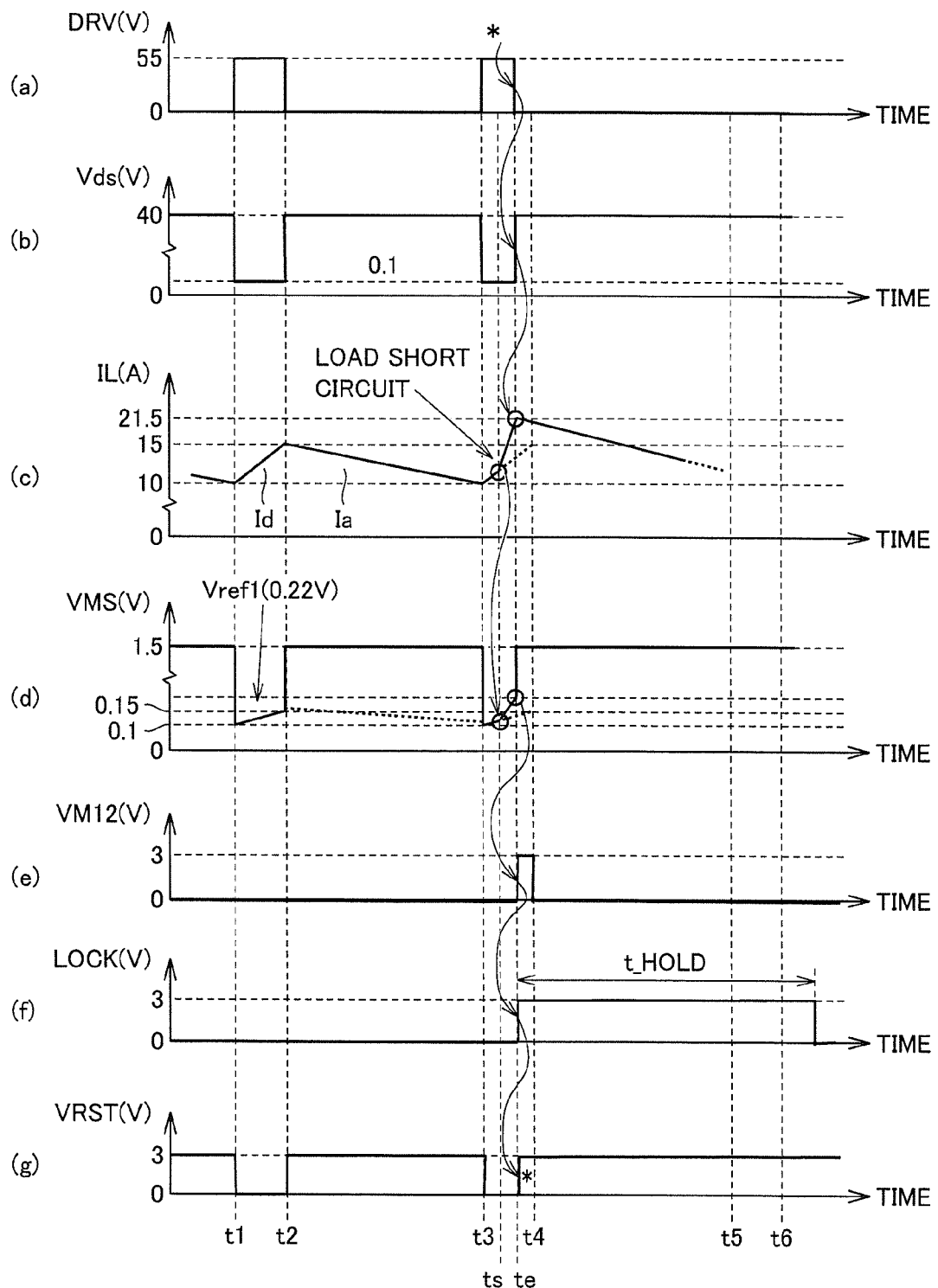
FIG. 8 is a timing chart showing the operation of the control circuit according to the second modification of the first embodiment of the present invention.

Change in the signals in FIG. 8 during the period from time t1 to time t2 in which cascode element CAS is in the conductive state and during the period from time t2 to time t3 in which cascode element CAS is in the non-conductive state is the same as the corresponding change in the signals in FIG. 4, and thus, description thereof will not be repeated. It should be noted that first protection signal V12 in FIG. 8 corresponds to first protection signal V10 in FIG. 4. In other words, both protection signals are outputted from first protection circuit PTVM.

<Operation when Abnormality is Detected>

The operation of control circuit 12 when an abnormality is detected during a period from time ts to time te will be described with reference to FIG. 8.

As shown in FIG. 8(a), at time t3, the level of drive signal DRV changes from the low level to the high level based on the output of oscillator OSC. It is assumed that short circuit occurs in load 6 of switching power supply circuit 1 or the coil is saturated at time ts.

As shown in FIG. 8(c), due to the short circuit in load 6 or the abnormality in the coil, drain current Id of cascode element CAS increases sharply after time ts.

As shown in FIG. 8(d), the sharp increase in drain current Id starting at time ts results in an increase in midpoint potential VM shown in FIG. 3. As a result, a value of midpoint-source voltage VMS outputted by differential amplifier circuit AMP increases sharply as well. During the period from time t1 to time t2 in which the operation is normal, the value of midpoint-source voltage VMS is within the range from 0.1 V to 0.15 V. The value of midpoint-source voltage VMS, however, increases sharply after time ts and reaches 0.22 V at time te.

Figure 7:
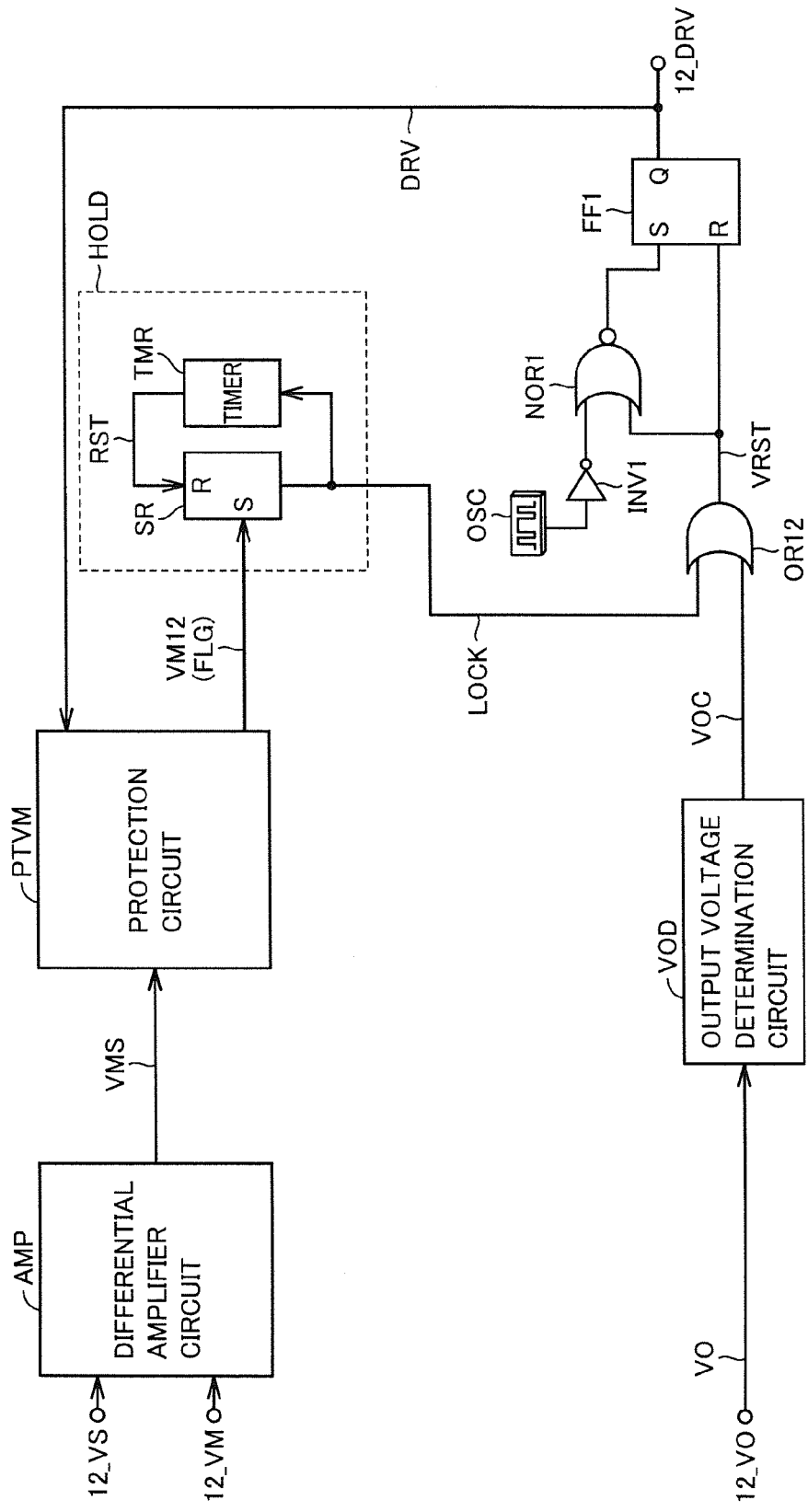
FIG. 7 is a circuit diagram of a control circuit according to a second modification of the first embodiment of the present invention.

Since drive signal DRV is retained in the high level after time t3, switch SW1 of first protection circuit PTVM shown in FIG. 7 (the specific circuit configuration is shown in FIG. 3) outputs midpoint-source voltage VMS to comparator OP1.

As shown in FIG. 8(e), first protection signal V12 (FLG) changes from the low level to the high level at time te. This is because the value of midpoint-source voltage VMS exceeds the abnormality detection voltage of 0.22 V set at reference power supply Vref1.

As shown in FIG. 8(f), the hold circuit (HOLD) outputs lock signal LOCK maintained in the high level, during a hold time t_HOLD (three seconds) set by timer TMR after time te.

As shown in FIG. 8(g), during the period in which lock signal LOCK is maintained in the high level, drive reset signal VRST is maintained in the high level.

During this period, drive signal output circuit FF1 outputs low-level drive signal DRV and cascode element CAS is maintained in the non-conductive state. The rising pulse of oscillator OSC generated during this period is canceled by INV1 and NOR1, and is never supplied to drive signal output circuit FF1. This is because during the period in which an output of two-input OR circuit OR12 is in the high level, the output of oscillator OSC changes from the high level to the low level at inverter INV1, and the low level input is selected from the high level input and the low level input to two-input NOR circuit NOR1.

During the period in which lock signal LOCK is maintained in the high level, energy is not stored in coil L, and power supplied to load 6 of switching power supply circuit 1 is also substantially zero. Therefore, the load and switching power supply circuit 1 are protected. Furthermore, cascode element CAS is maintained in the non-conductive state during the period set by hold circuit HOLD. During this period, the not-shown system microcomputer can carry out abnormality diagnosis of the entire system including switching power supply circuit 1. When an abnormality is detected, the system is shut down. When an abnormality is not detected, lock signal LOCK is canceled (shifted from the high level to the low level) after the time set by timer TMR elapses.

The second modification of the first embodiment is configured such that hold circuit HOLD is combined with first protection circuit PTVM. However, a configuration in which hold circuit HOLD is combined with second protection circuit PTVMa instead of first protection circuit PTVM can also produce similar functions and effects.

<<Third Modification of First Embodiment>>

Figure 9:
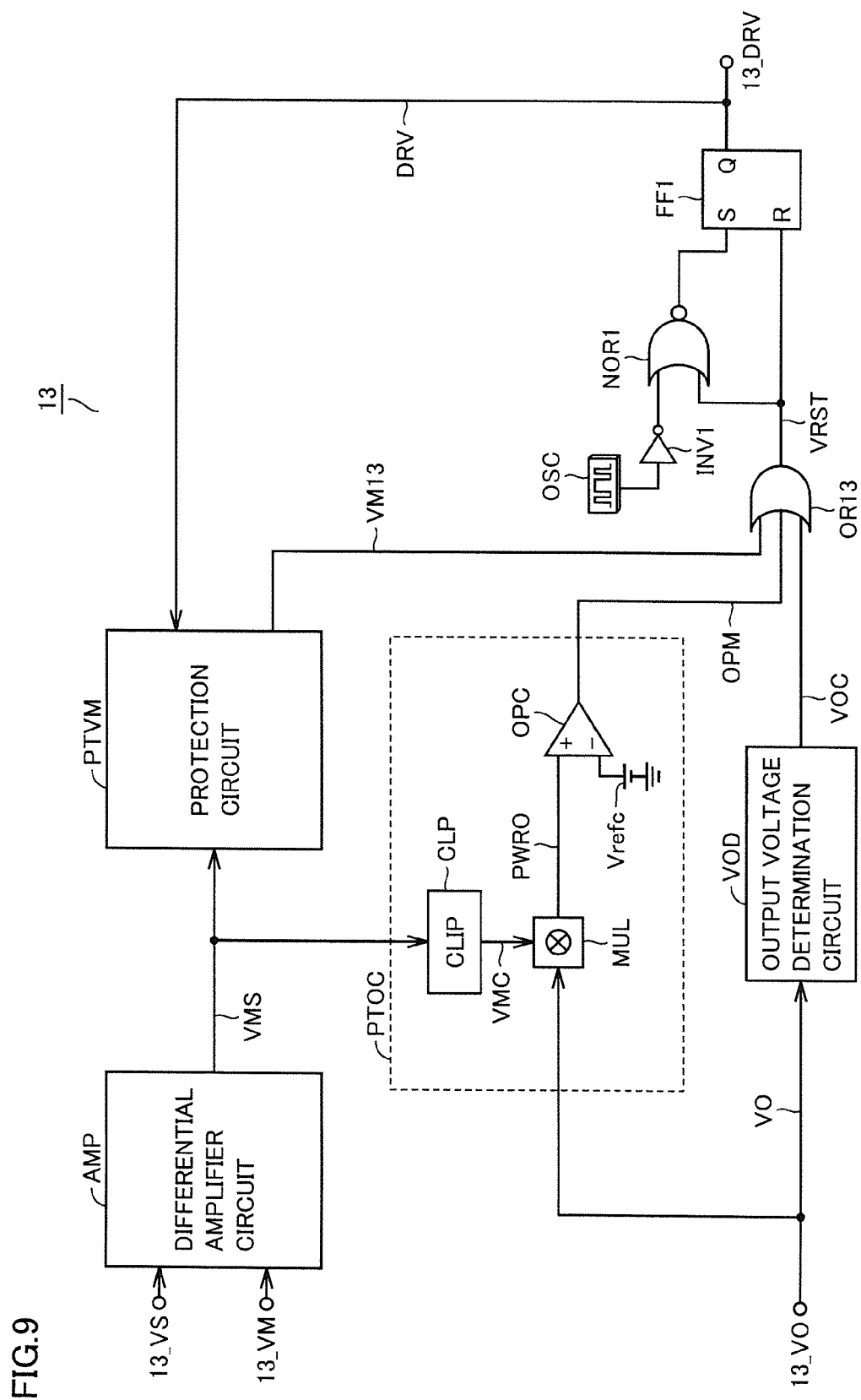
FIG. 9 is a circuit diagram of a control circuit according to a third modification of the first embodiment of the present invention.

A circuit diagram of a control circuit 13 according to a third modification of the first embodiment of the present invention will be described with reference to FIG. 9.

Control circuit 13 differs from control circuit 10 shown in FIG. 3 in that an output power monitor circuit PTOC is added. Along with this, two-input OR circuit OR10 (FIG. 3) generating drive reset signal VRST is replaced with a three-input OR circuit OR13.

Output power monitor circuit PTOC has a clip circuit CLP, a multiplication circuit MUL, a comparator OPC, and a reference power supply Vrefc. Clip circuit CLP generates a midpoint clip voltage VMC obtained by clipping 0.2 V or higher of midpoint-source voltage VMS. Multiplication circuit MUL outputs an output power signal PWRO that is a value obtained by multiplying output voltage monitor signal VO by midpoint clip voltage VMC. Comparator OPC compares output power signal PWRO and reference power supply Vrefc, and outputs a third protection signal OPM having binary values. The remaining configurations shown in FIG. 9 are the same as the corresponding configurations shown in FIG. 3 to which the same reference characters are assigned, and thus, description thereof will not be repeated.

Based on the current flowing through cascode element CAS and the DC output voltage of switching power supply circuit 1 shown in FIG. 1, output power monitor circuit PTOC estimates a value of power supplied to load 6 by switching power supply circuit 1. When the estimated power exceeds a predetermined value, cascode element CAS shifts from the conductive state to the non-conductive state.

The operation of control circuit 13 according to the third modification of the first embodiment of the present invention will be described with reference to FIG. 10.

<Operation in Normal State>

Figure 10:
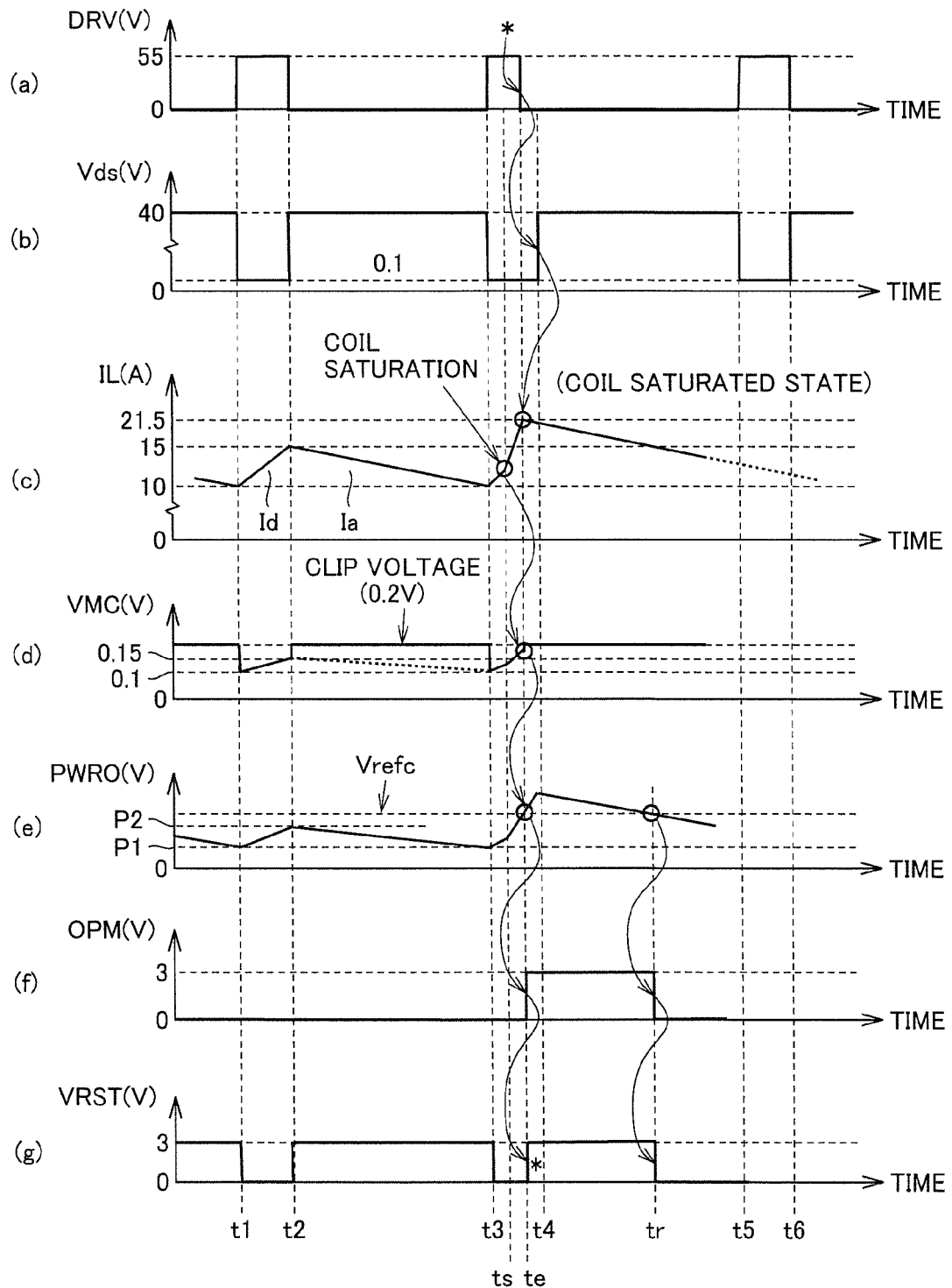
FIG. 10 is a timing chart showing the operation of the control circuit according to the third modification of the first embodiment of the present invention.

As shown in FIG. 10, during the period from time t1 to time t2, cascode element CAS is brought into conduction, and thus, coil current IL of coil L increases from 10 A to 15 A. During this period, midpoint-source voltage VMS increases approximately within the range from 0.1 V to 0.15 V. Therefore, a value of midpoint-source voltage VMS is directly outputted as midpoint clip voltage VMC, without being clipped by clip circuit CLP. A value of output power signal PWRO during this period increases from P1 to P2. The value, however, never exceeds a value of reference power supply Vrefc and third protection signal OPM is maintained in the low level.

As shown in FIG. 10(c), during the period from time t2 to time t3, cascode element CAS is brought out of conduction. As a result, drain current Id of cascode element CAS becomes zero and anode current Ia flowing from coil L to diode Di decreases from 15 A to 10 A. During this period, the value of midpoint-source voltage VMS is set to be a voltage of around 1.5 V, which is the threshold voltage of normally-on type transistor Tr_non of cascode element CAS.

As shown in FIG. 10(d), the value exceeding 0.2 V, of midpoint-source voltage VMS having the value of 1.5 V, is clipped by clip circuit CLP and outputted to multiplication circuit MUL as midpoint clip voltage VMC having the value of 0.2 V. From time t2 to time t3, the broken line decreasing from 0.15 V to 0.1 V is shown, separately from midpoint clip voltage VMC shown by the solid line. This broken line indicates a waveform of midpoint-source voltage VMS assumed when anode current Ia flowing through diode Di is detected in cascode element CAS.

During the period from time t1 to time t2, the current flowing through coil L can be correctly measured based on midpoint-source voltage VMS. However, during the period from time t2 to time t3, midpoint potential VM of cascode element CAS that is in the non-conductive state goes into the floating state. This midpoint potential VM becomes stable when the potential of gate G_non with respect to source S_non of normally-on type transistor Tr_non is near the threshold voltage of normally-on type transistor Tr_non.

In other words, during the period in which cascode element CAS is in the non-conductive state, the current of coil L cannot be correctly measured based on midpoint potential VM. Thus, the value of midpoint-source voltage VMS showing the value of around 1.5 V is clipped to, for example, 0.2 V by clip circuit CLP. With this clip circuit CLP, an error, which is caused by the impossibility of measuring the current of coil L due to cascode element CAS that is in the non-conductive state, is eliminated as much as possible.

Midpoint-source voltage VMS is obtained by converting coil current IL flowing through coil L into a voltage by cascode element CAS. During the period in which the cascode element is in the non-conductive state, this coil current IL is shown by the aforementioned broken line. In the present embodiment, the value of midpoint-source voltage VMS during this period is clipped by clip circuit CLP to generate midpoint clip voltage VMC having the value of 0.2 V. This midpoint clip voltage VMC is set as a value obtained by approximating anode current Ia shown by this broken line (coil current IL during the period in which cascode element CAS is in the non-conductive state).

A measurement error caused by this approximation is about 50%, and when further measurement accuracy is required, the measurement error may be adjusted by reducing the clip voltage to, for example, 0.17 V. Setting of a minimum value of this clip voltage is determined in consideration of a maximum value of midpoint-source voltage VMS during the period in which cascode element CAS is in the conductive state.

<Operation when Abnormality is Detected>

As shown in FIG. 10(c), cascode element CAS is again brought into conduction at time t3. Thereafter, coil L is saturated at time ts and coil current IL increases to 21.5 A at time te.

As shown in FIG. 10(e), when midpoint-source voltage VMS exceeds the maximum value of 0.15 V in the normal state, output power signal PWRO exceeds the value of reference power supply Vrefc at time te. As a result, output power monitor circuit PTOC changes third protection signal OPM from the low level to the high level (FIG. 10(f)). As a result of this change in third protection signal OPM, drive reset signal VRST resets drive signal output circuit FF1 and drive signal DRV brings cascode element CAS out of conduction (FIG. 10(g)).

As shown in FIGS. 10(e), 10(f) and 10(g), when coil current IL (anode current Ia of diode Di) decreases, output voltage monitor signal VO decreases. At time tr, output power signal PWRO becomes equal to or smaller than reference power supply Vrefc. Then, third protection signal OPM changes from the high level to the low level and drive reset signal VRST also changes from the high level to the low level. As a result, return to the usual operation state is achieved.

This output power monitor circuit PTOC detects whether or not there is an abnormal power supply from switching power supply circuit 1 to load 6. When an abnormality is detected, current supply from cascode element CAS to coil L is stopped, and switching power supply circuit 1 and load 6 are protected.

Abnormality detection at switching power supply circuit 1 by output power monitor circuit PTOC can be carried out in parallel with abnormality detection by second protection circuit PTVMa instead of first protection circuit PTVM. In addition, an output of first protection circuit PTVM or second protection circuit PTVMa may be inputted to hold circuit HOLD shown in FIG. 7 and drive signal output circuit FF1 may be reset in accordance with lock signal LOCK outputted by hold circuit HOLD.

<<Fourth Modification of First Embodiment>>

A circuit diagram of a switching power supply circuit 1*a* according to a fourth modification of the first embodiment of the present invention will be described with reference to FIG. 11.

Switching power supply circuit 1*a* differs from switching power supply circuit 1 shown in FIG. 1 in that an input voltage monitor circuit VIM generating an input voltage monitor signal VI is added and in that control circuit 10 in FIG. 1 is replaced with a control circuit 14.

Input voltage monitor circuit VIM has a resistor R3 and a resistor R4 serially connected between input nodes N1 and N2 of switching power supply circuit 1*a*. From a point connecting resistor R3 and resistor R4, DC input voltage Vdc (40 V) applied between input nodes N1 and N2 is outputted as input voltage monitor signal VI divided into, for example, 1 V. Control circuit 14 differs from control circuit 10 according to the first embodiment of the present invention shown in FIG. 3 in that an input terminal 15_VI to which input voltage monitor signal VI is inputted is newly added.

Figure 12:
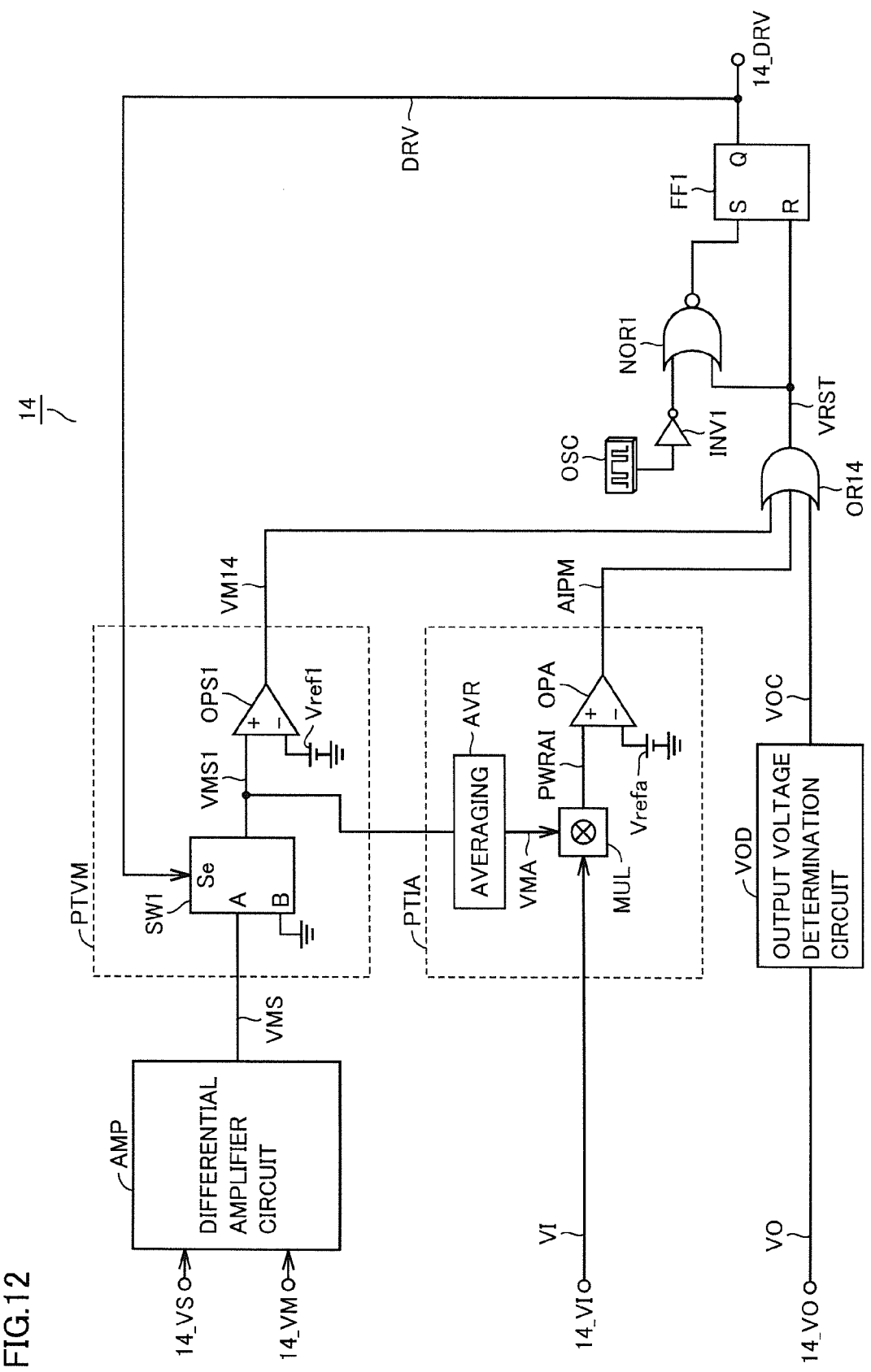
FIG. 12 is a circuit diagram of a control circuit according to the fourth modification of the first embodiment of the present invention.

A circuit diagram of control circuit 14 according to the fourth modification of the first embodiment of the present invention will be described with reference to FIG. 12.

An average input power monitor circuit PTIA included in control circuit 14 has an averaging circuit AVR, a multiplication circuit MUL, a comparator OPA, and a reference power supply Vrefa. Averaging circuit AVR averages midpoint-source voltage VMS1 outputted by switch SW1, and outputs an average midpoint potential VMA. Multiplication circuit MUL outputs a result of multiplication of input voltage monitor signal VI and average midpoint potential VMA to comparator OPA as an average input power signal PWRAI.

Comparator OPA compares average input power signal PWRAI and reference power supply Vrefa, and outputs a result of comparison as a fourth protection signal AIPM having binary values. Fourth protection signal AIPM is inputted to a three-input OR circuit OR14, together with a first protection signal VM14 and output voltage control signal VOC. The remaining configurations shown in FIG. 12 are the same as the corresponding configurations shown in FIG. 3 to which the same reference characters are assigned, and thus, description thereof will not be repeated.

Midpoint-source voltage VMS1 and input voltage monitor signal VI for cascode element CAS are generated based on an input current and an input voltage of switching power supply circuit 1*a*, respectively. Based on these generated signals, average input power monitor circuit PTIA calculates average input power of switching power supply circuit 1*a*. When the calculated value exceeds a predetermined value, drive signal output circuit FF1 is reset in accordance with fourth protection signal AIPM and switching power supply circuit 1*a* is protected.

Figure 11:
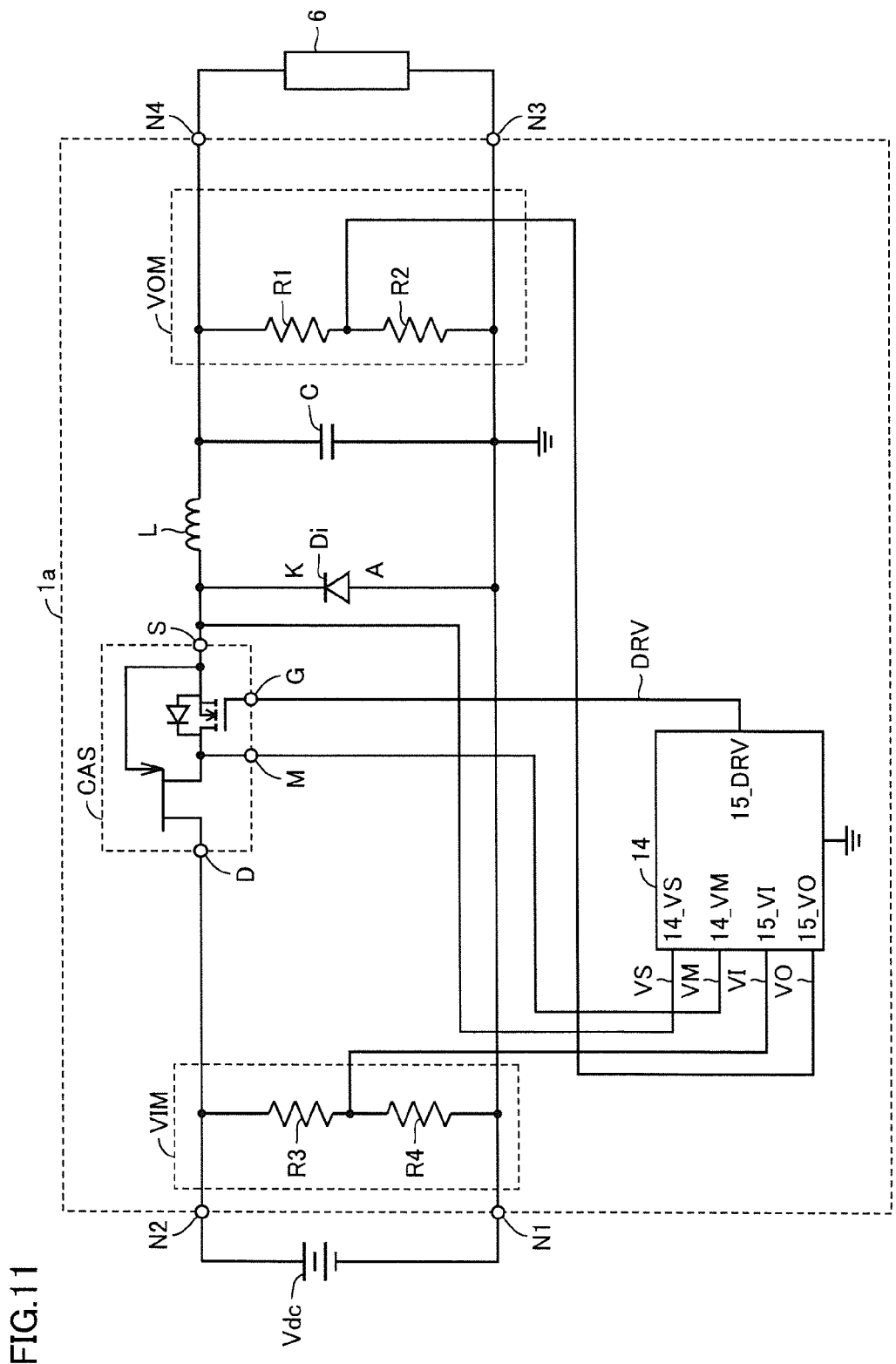
FIG. 11 is a circuit diagram of a switching power supply circuit according to a fourth modification of the first embodiment of the present invention.

Input power of switching power supply circuit 1*a* shown in FIG. 11 is obtained as a product of the input voltage and the input current. As shown in FIG. 12, the input voltage is converted into input voltage monitor signal VI outputted by input voltage monitor circuit VIM. The input current is converted into midpoint-source voltage VMS1 generated based on the current flowing through cascode element CAS.

Input voltage monitor signal VI is generated based on DC input voltage Vdc applied between input nodes N1 and N2, regardless of whether cascode element CAS is in the conductive state or in the non-conductive state. On the other hand, a voltage that is a product of the on resistance of normally-off type transistor Tr_noff (an apparent resistance value between drain D_noff and source S_noff) and drain current Id of cascode element CAS is obtained as midpoint-source voltage VMS1 when cascode element CAS is in the conductive state.

An average of the current flowing during the period in which cascode element CAS is in the conductive state corresponds to the input current of switching power supply circuit 1*a*. In FIG. 12, when cascode element CAS is in the non-conductive state, switch SW 1 outputs the ground potential (0 V) during the period in which drive signal DRV is in the low level, and thus, a value becomes zero. In other words, an output of multiplication circuit MUL is used as information about the input power of switching power supply circuit 1*a*.

During the normal operation of switching power supply circuit 1*a*, a value of average input power signal PWRAI never exceeds a value of reference power supply Vrefa, and the conduction state of cascode element CAS is controlled in accordance with output voltage control signal VOC and first protection signal VM14.

On the other hand, when load short circuit occurs at switching power supply circuit 1*a* or coil L is saturated, the input current increases abnormally. This abnormal increase in the input current results in increase in midpoint-source voltage VMS1, and further, increase in average input power signal PWRAI. When average input power signal PWRAI exceeds reference power supply Vrefa, fourth protection signal AIPM changes from the low level to the high level and drive signal DRV is set to be in the low level.

As described above, average input power monitor circuit PTIA detects abnormal power supply to switching power supply circuit 1*a*. When an abnormality is detected, cascode element CAS is set to be in the non-conductive state, and switching power supply circuit 1*a*, coil L or load 6 is protected.

<<Second Embodiment>>

A circuit diagram of a switching power supply circuit 2 according to a second embodiment of the present invention will be described with reference to FIG. 13.

Switching power supply circuit 2 includes input nodes N1 and N2 to which DC input voltage Vdc is applied, as well as output nodes N3 and N4 from which a DC output voltage obtained by boosting DC input voltage Vdc is outputted and to which load 6 is connected. One terminal and the other terminal of coil L are connected to input node N2 and drain terminal D of the cascode element, respectively. Source terminal S of cascode element CAS is connected to input node N1.

Switching power supply circuit 2 constitutes a boosting converter. As one example, a DC input power supply of 100 V is applied between input nodes N1 and N2, and a DC output voltage boosted to 400 V is outputted from output nodes N3 and N4. It should be noted that a commercial AC power supply may be connected in some cases between input nodes N1 and N2, with a diode bridge and a line filter interposed therebetween. Output voltage monitor circuit VOM divides the DC output voltage boosted to 400 V into a voltage of approximately 1 V, for example, and outputs the voltage as output voltage monitor signal VO.

Anode A and cathode K of diode Di are connected to the other terminal of coil L and output node N4, respectively. Output voltage monitor circuit VOM generating output voltage monitor signal VO is connected between output nodes N3 and N4.

Switching power supply circuit 2 further includes a control circuit 20. Control circuit 20 has an input terminal 20_VM, an input terminal 20_VO and an output terminal 20_DRV, and midpoint potential VM outputted from midpoint terminal M of cascode element CAS and output voltage monitor signal VO are applied to these input terminals, respectively. Control circuit 20 generates drive signal DRV based on these signals applied to the input terminals, and outputs drive signal DRV to gate terminal G of cascode element CAS. Since the configuration of cascode element CAS is as shown in FIG. 2, description thereof will not be repeated.

A circuit diagram of control circuit 20 according to the second embodiment of the present invention will be described with reference to FIG. 14.

Control circuit 20 differs from control circuit 12 according to the second modification of the first embodiment of the present invention shown in FIG. 7 in that differential amplifier circuit AMP is deleted. In the first embodiment, the potential of source terminal S of cascode element CAS changes, and differential amplifier circuit AMP is required to obtain the potential of midpoint terminal M with respect to source terminal S. In the second embodiment, however, source terminal S has the ground potential, and thus, differential amplifier circuit AMP is unnecessary.

During the period in which drive signal DRV is in the high level, first protection circuit PTVM compares inputted midpoint potential VM and reference power supply Vref1, and changes a first protection signal VM20 to the high level when an abnormality occurs. Hold circuit HOLD maintains lock signal LOCK in the high level during the predetermined period, and resets drive signal output circuit FF1 and maintains drive signal DRV in the low level. During the period in which lock signal LOCK is in the high level, information about the rising pulse of oscillator OSC is canceled by inverter INV1 and two-input NOR circuit NOR1, and is not supplied to drive signal output circuit FF1.

Figure 13:
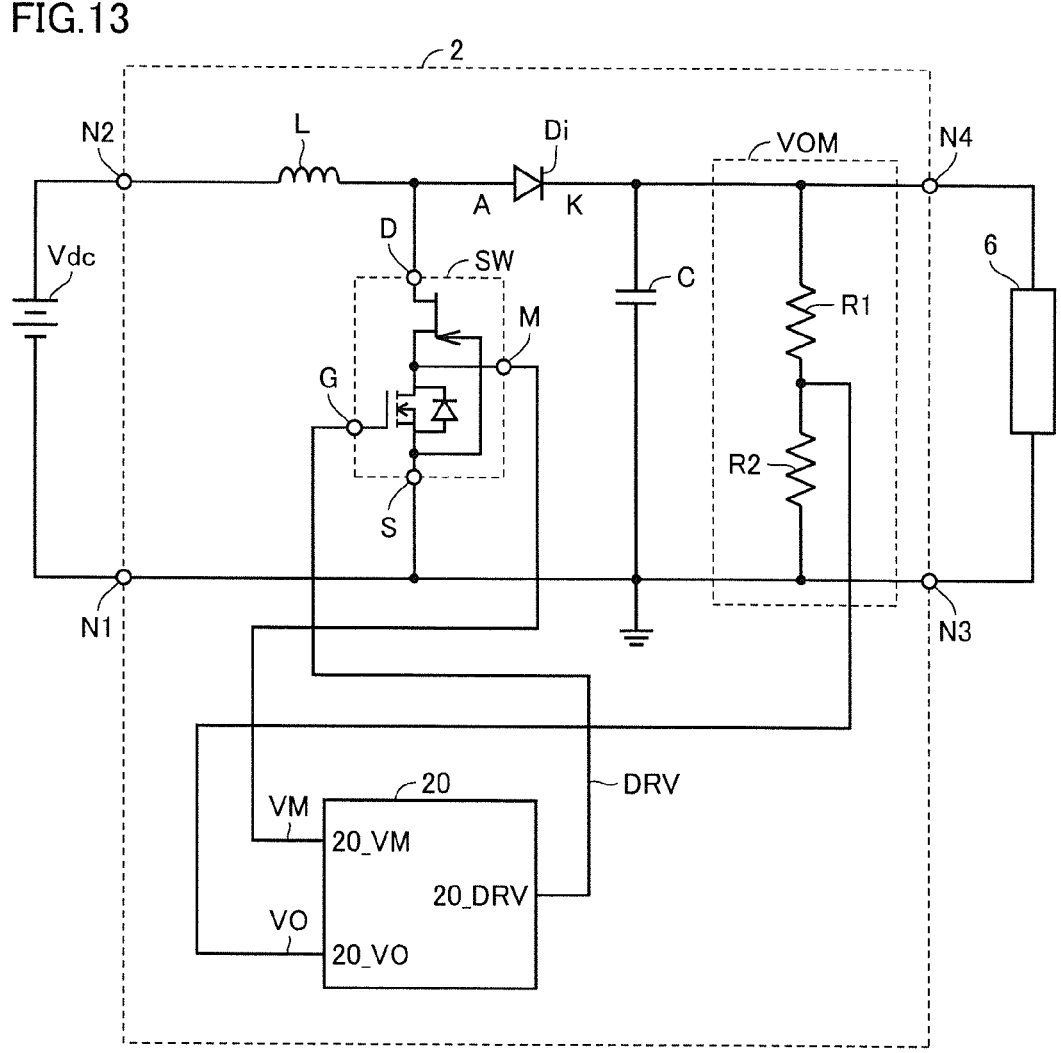
FIG. 13 is a circuit diagram of a switching power supply circuit according to a second embodiment of the present invention.

The operation of control circuit 20 in FIG. 13 when short circuit occurs in load 6 or coil L is saturated during the period in which cascode element CAS is in the conductive state is the same as that according to the second modification of the first embodiment shown in FIG. 8, if the voltage value is replaced with an on duty time (time from time t1 to time t2).

Midpoint potential VM when cascode element CAS is in the conductive state is a voltage determined by a product of drain current Id of drain terminal D of cascode element CAS and the on resistance of normally-off type transistor Tr_noff. Abnormal voltage increase in this midpoint potential VM shows an abnormality in drain current Id caused by short circuit in load 6 or saturation of coil L. Therefore, by monitoring the voltage value of midpoint potential VM during the period in which cascode element CAS is in the conductive state, switching power supply circuit 2 can be protected.

As described above, the embodiment of the present invention is also suitable for the boosting converter.

<<First Modification of Second Embodiment>>

A circuit diagram of a switching power supply circuit 2a according to a first modification of the second embodiment of the present invention will be described with reference to FIG. 15.

Switching power supply circuit 2a differs from switching power supply circuit 2 shown in FIG. 13 in that input voltage monitor circuit VIM generating input voltage monitor signal VI is added and in that control circuit 20 in FIG. 13 is replaced with a control circuit 21.

Input voltage monitor circuit VIM has resistor R3 and resistor R4 serially connected between input nodes N1 and N2 of switching power supply circuit 2a. From the point connecting resistor R3 and resistor R4, DC input voltage Vdc (100 V) applied between input nodes N1 and N2 is outputted as input voltage monitor signal VI divided into, for example, 1 V.

Figure 16:
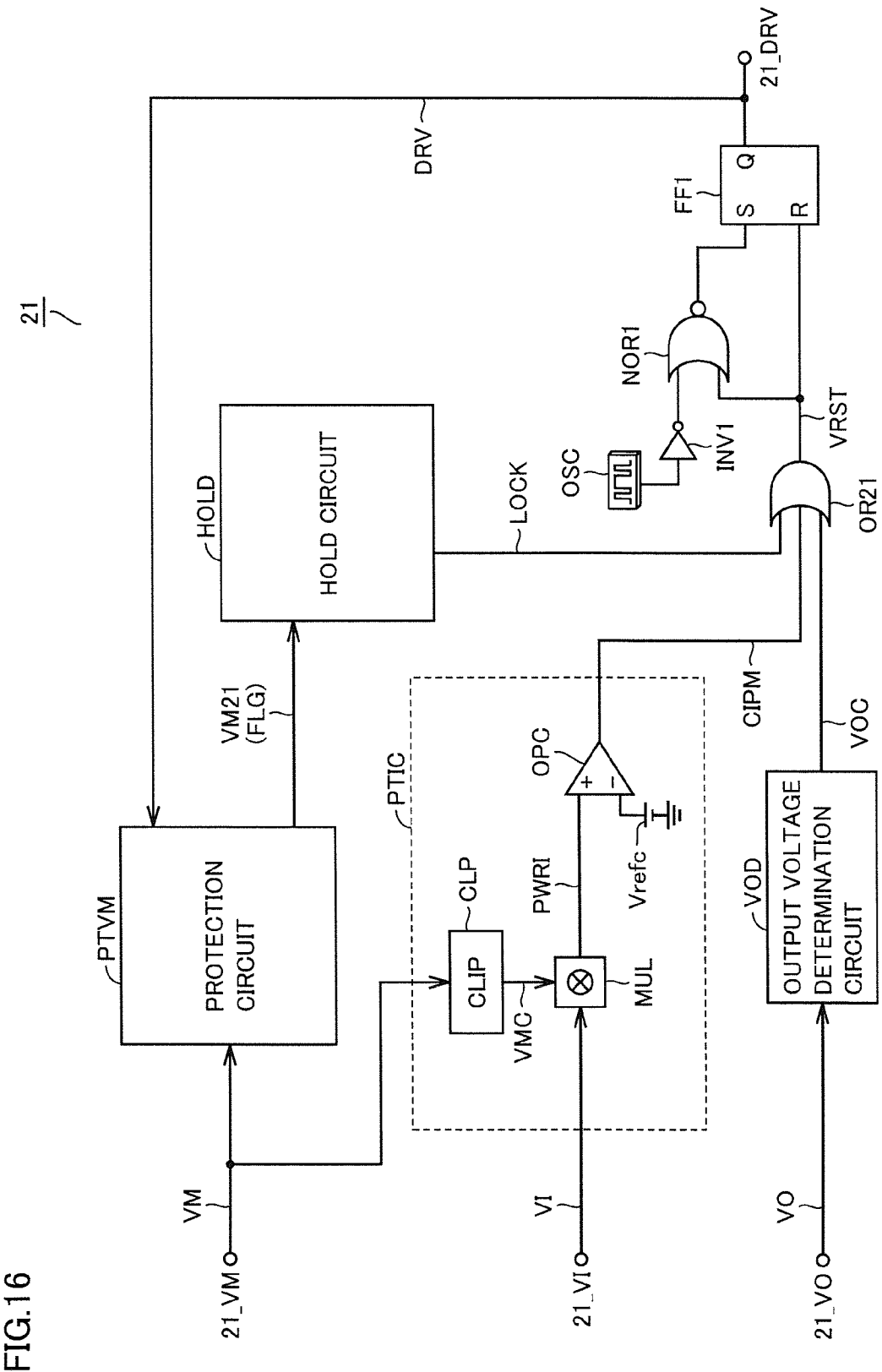
FIG. 16 is a circuit diagram of a control circuit according to the first modification of the second embodiment of the present invention.

A circuit diagram of control circuit 21 according to the first modification of the second embodiment of the present invention will be described with reference to FIG. 16.

Figure 14:
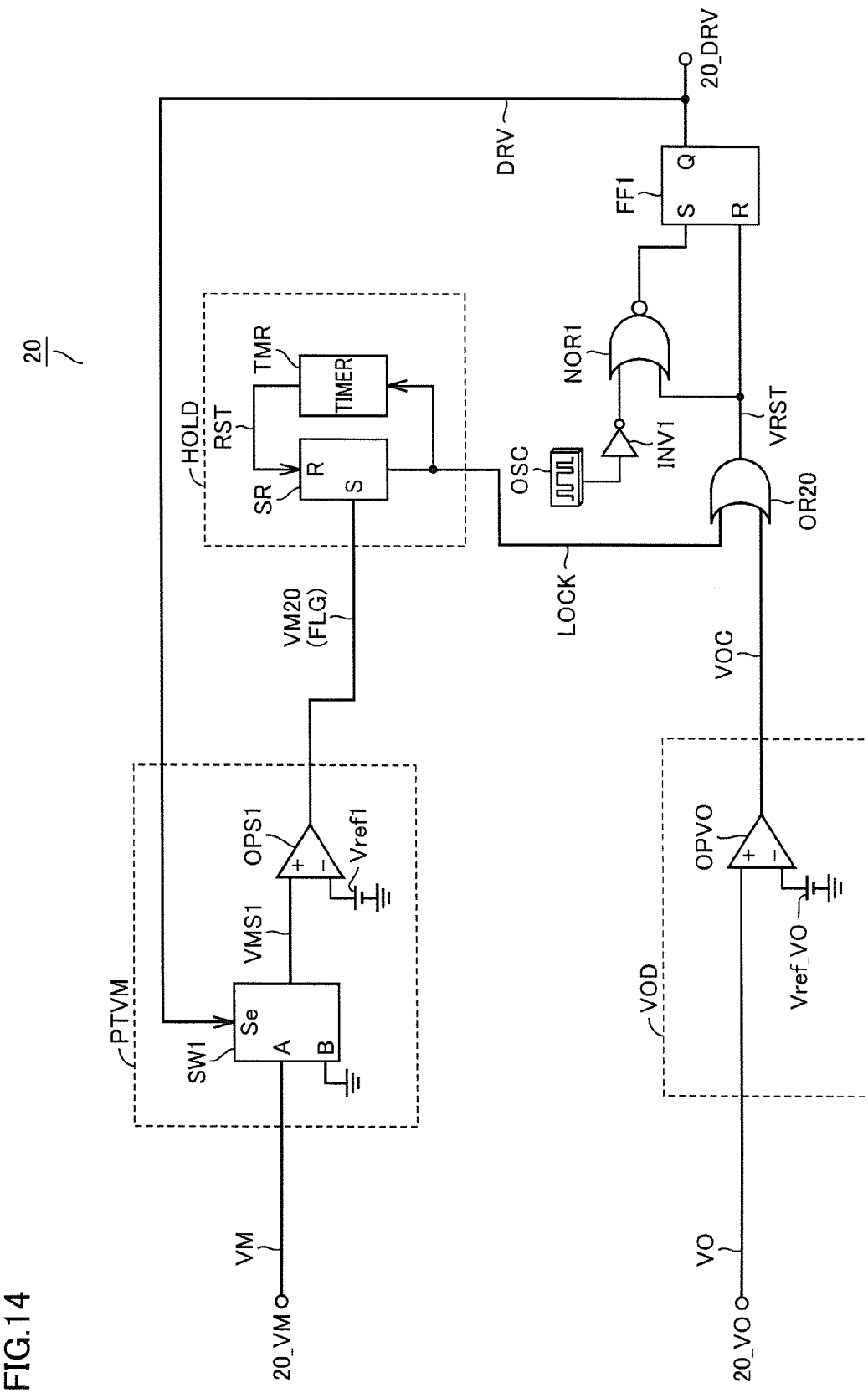
FIG. 14 is a circuit diagram of a control circuit according to the second embodiment of the present invention.

Control circuit 21 differs from control circuit 20 shown in FIG. 14 in that an input power monitor circuit PTIC is added, and along with this, two-input OR circuit OR20 is replaced with a three-input OR circuit OR21.

Input power monitor circuit PTIC has clip circuit CLP, multiplication circuit MUL, comparator OPC, and reference power supply Vrefc. Clip circuit CLP generates midpoint clip voltage VMC obtained by clipping midpoint potential VM to a predetermined voltage. Multiplication circuit MUL outputs, as input power signal PWRI, a value obtained by multiplying input voltage monitor signal VI by midpoint clip voltage VMC. Comparator OPC compares input power signal PWRI and reference power supply Vrefc, and outputs a fifth protection signal CIPM having binary values. The remaining configurations shown in FIG. 16 are the same as the corresponding configurations shown in FIG. 14 to which the same reference characters are assigned, and thus, description thereof will not be repeated.

Figure 17:
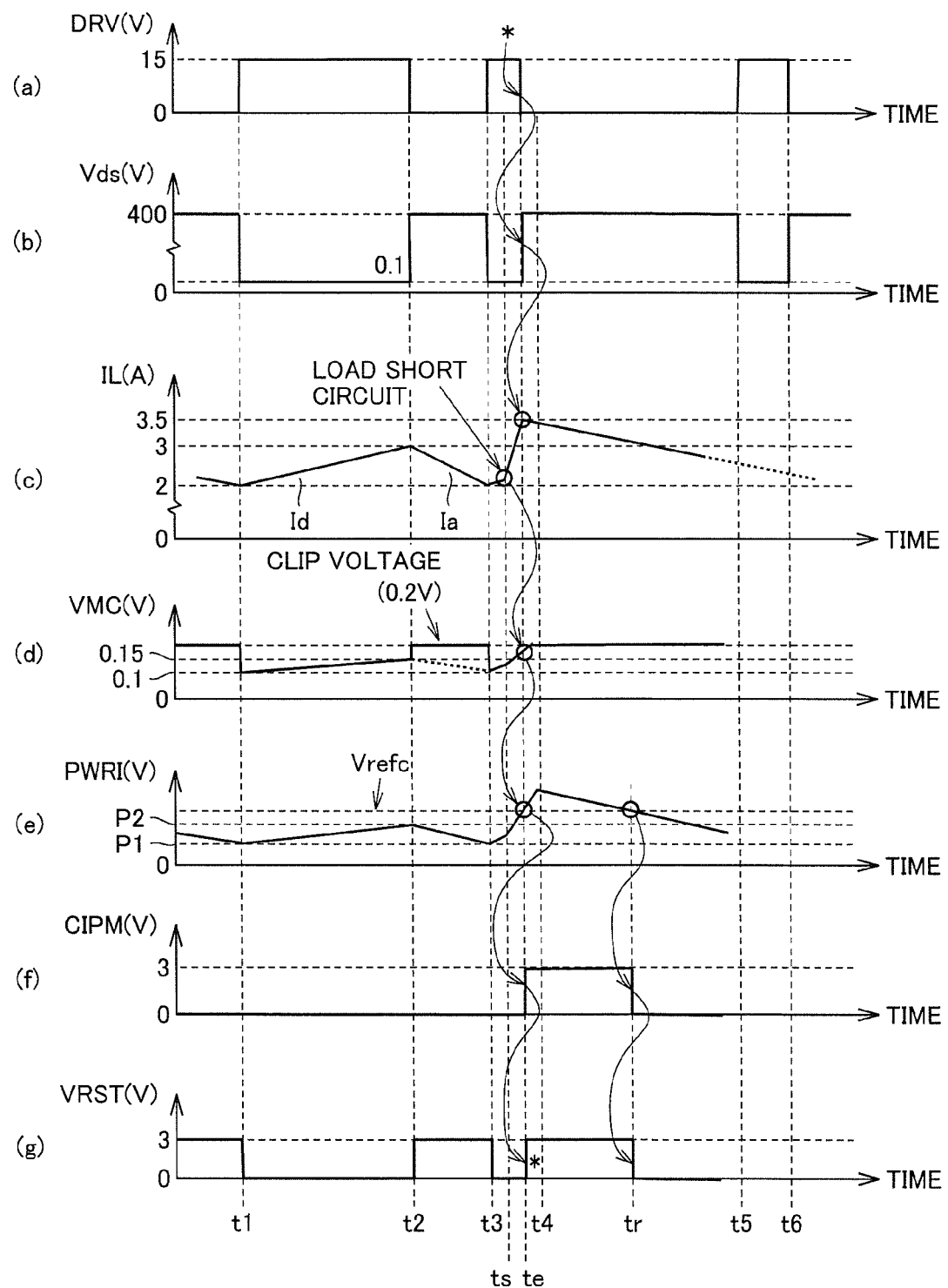
FIG. 17 is a timing chart showing the operation of the control circuit according to the first modification of the second embodiment of the present invention.

The operation of control circuit 21 according to the first modification of the second embodiment of the present invention will be described with reference to FIG. 17.

<Operation in Normal State>

As shown in FIGS. 17(c) and 17(d), during the period from time t1 to time t2, cascode element CAS is brought into conduction, and thus, coil current IL of coil L increases from 2 A to 3 A. During this period, midpoint-source voltage VMS increases approximately from 0.1 V to 0.15 V. Therefore, a value of midpoint-source voltage VMS is directly outputted as midpoint clip voltage VMC, without being clipped by clip circuit CLP. Midpoint-source voltage VMS during this period corresponds to a value of a power supply current supplied from DC input power supply Vdc to coil L during the period in which cascode element CAS is in the conductive state.

Since cascode element CAS is in the non-conductive state during the period from time t2 to time t3, midpoint potential VM is set to be 1.5 V. Clip circuit CLP clips midpoint potential VM to 0.2 V, and outputs the potential to multiplication circuit MUL as midpoint clip voltage VMC having the value of 0.2 V (FIG. 17(d)).

From time t2 to time t3, the broken line decreasing from 0.15 V to 0.1 V is shown, separately from midpoint clip voltage VMC shown by the solid line (FIG. 17(d)). This broken line indicates a waveform of midpoint-source voltage VMS assumed when anode current Ia flowing from coil L through diode Di is detected in cascode element CAS. Midpoint-source voltage VMS shown by the broken line corresponds to a value of a power supply current supplied from DC input power supply Vdc to coil L during the period in which cascode element CAS is in the non-conductive state.

Clip circuit CLP clips the voltage of 1.5 V outputted as midpoint-source voltage VMS to 0.2 V, and thereby outputs an approximate value of the original value shown by the broken line. A measurement error caused by this approximation is about 50%, and when further measurement accuracy is required, the measurement error may be adjusted by reducing the clip voltage to, for example, 0.17 V. Setting of a minimum value of this clip voltage is determined in consideration of a maximum value of midpoint-source voltage VMS during the period in which cascode element CAS is in the conductive state.

During the period from time t1 to time t2 in which cascode element CAS is in the conductive state, the current of coil L can be correctly measured based on midpoint-source voltage VMS. However, during the period from time t2 to time t3, midpoint potential VM of cascode element CAS that is in the non-conductive state goes into the floating state. Midpoint potential VM during this period becomes stable when the potential of gate G_non with respect to source S_non of normally-on type transistor Tr_non is near the threshold voltage of normally-on type transistor Tr_non. Therefore, the current of coil L cannot be correctly measured based on midpoint potential VM.

Thus, the value of midpoint-source voltage VMS showing the value of around 1.5 V is clipped to, for example, 0.2 V by clip circuit CLP. With this clip circuit CLP, an error, which is caused by the impossibility of measuring the current of coil L due to cascode element CAS that is in the non-conductive state, is eliminated as much as possible.

As shown in FIGS. 17(e) and 17(f), during the period from time t1 to time t3 in which switching power supply circuit 2a operates normally, input power signal PWRI increases from P1 (time t1) to P2 (time t2), and thereafter, decreases to P1 (time t3). Since the value of input power signal PWRI does not exceed the value of reference power supply Vrefc during this period, fifth protection signal CIPM is maintained in the low level (0 V).

<Operation when Abnormality is Detected>

As shown in FIG. 17(c), cascode element CAS is again brought into conduction at time t3. Thereafter, a failure (short circuit) occurs in load 6 at time ts and coil current IL increases to 3.5 A at time te.

As shown in FIGS. 17(d) to 17(g), at time te, midpoint-source voltage VMS exceeds the maximum value of 0.15 V in the normal state. Then, the value of input power signal PWRI reaches the value of reference power supply Vrefc (FIG. 17(e)). At this time, input power monitor circuit PTIC in FIG. 16 changes fifth protection signal CIPM from the low level to the high level (FIG. 17(f)), and in response to the change in the signal, drive reset signal VRST also changes to the high level (FIG. 17(g)).

At time te, drive signal DRV changes to the low level (FIG. 17(a)). Then, the value of coil current IL starts decreasing from 3.5 A (FIG. 17(c)). Input power signal PWRI continues increasing during the period in which midpoint-source voltage VMS exceeds 0.15 V and reaches clip voltage of 0.2 V at time te, and thereafter, input power signal PWRI starts decreasing. At time tr, input power signal PWRI becomes smaller than reference power supply Vrefc (FIG. 17(e)). Then, fifth protection signal CIPM changes from the high level to the low level, and in response to this, drive reset signal VRST also changes to the low level. After that, return to the usual operation mode is achieved (FIGS. 17(f) and 17(g)).

In switching power supply circuit 2a according to the first modification of the second embodiment, the inputted power is constantly monitored during the period in which cascode element CAS is in the conductive state and the period in which cascode element CAS is in the non-conductive state, based on DC input voltage Vdc and the input current obtained by cascode element CAS. As a result, when a malfunction occurs at switching power supply circuit 2a and load 6, current supply is stopped quickly, and switching power supply circuit 2a and the load are protected.

<<Third Embodiment>>

A circuit diagram of a switching power supply circuit 3 according to a third embodiment of the present invention will be described with reference to FIG. 18.

Switching power supply circuit 3 is a boosting converter circuit including a continuous-current-mode power factor improvement circuit. Switching power supply circuit 3 is the same as switching power supply circuit 2a according to the first modification of the second embodiment shown in FIG. 15 except for the following points. Switching power supply circuit 3 includes a sense resistor RS between input node N1 and a point connecting resistor R4 and output node N3, and a power supply current signal CS is outputted from one terminal of sense resistor RS.

An input voltage obtained by rectifying an AC power supply AC by a diode bridge DB is applied between input node N1 and input node N2. A waveform of this input voltage is a waveform obtained by full-wave rectification of a sinusoidal voltage of AC power supply AC, and is a voltage waveform changing within the range from 0 V to 141 V (obtained by multiplying 100 Vrms by $\sqrt{2}$) in the cycle of 100/120 Hz (two times as high as the commercial power supply frequency of 50/60 Hz).

Figure 15:
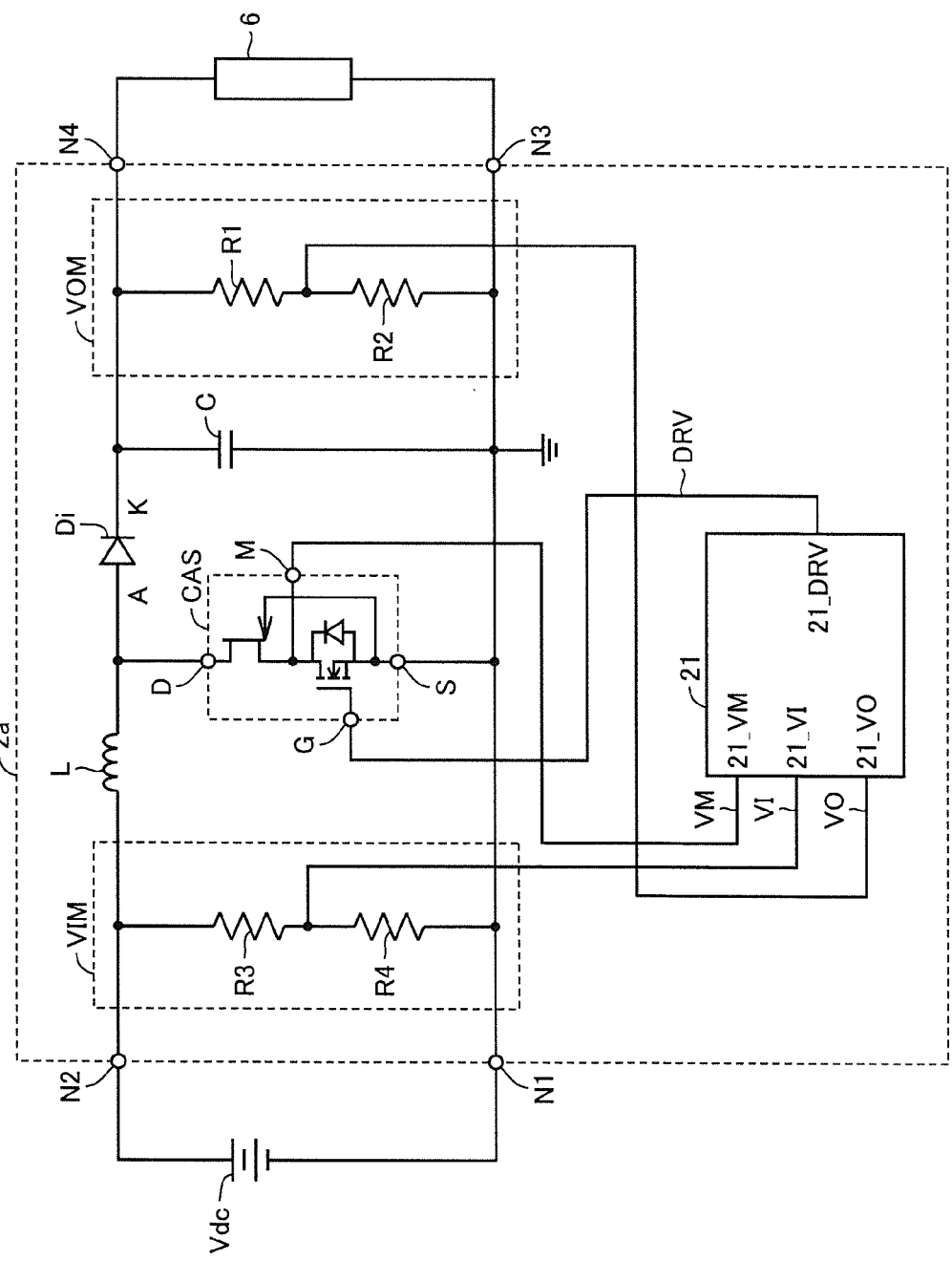
FIG. 15 is a circuit diagram of a switching power supply circuit according to a first modification of the second embodiment of the present invention.

Furthermore, unlike control circuit 21 shown in FIG. 15, power supply current signal CS is inputted to an input terminal 30_CS of a control circuit 30. Power supply current signal CS is obtained by converting a power supply current on the ground side of switching power supply circuit 3 into a voltage, and the power supply current is nearly equal to the current flowing through coil L.

Figure 18:
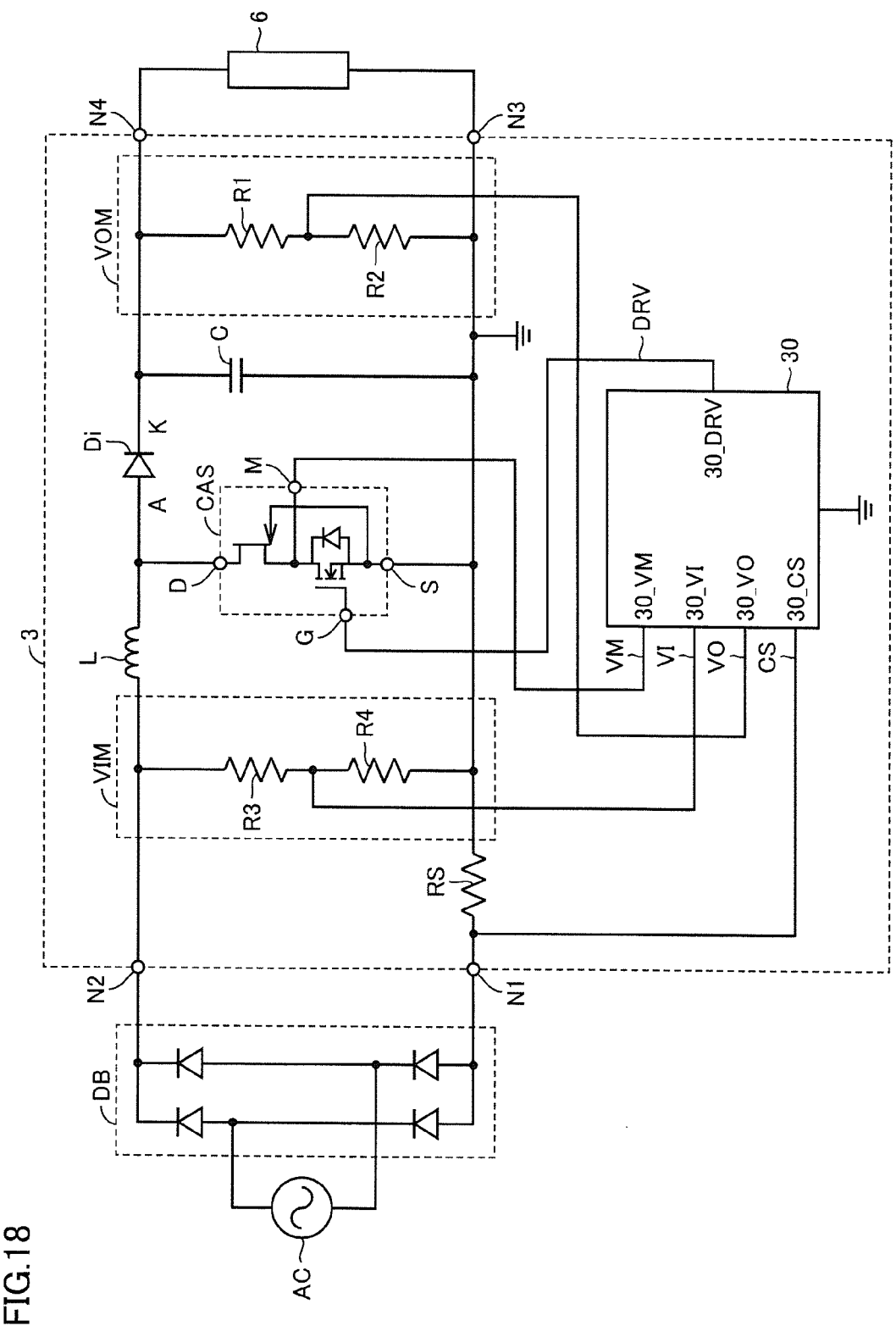
FIG. 18 is a circuit diagram of a switching power supply circuit according to a third embodiment of the present invention.

Diode bridge DB is connected between input node N1 and input node N2 of switching power supply circuit 3 shown in FIG. 18, and the voltage obtained by full-wave rectification of the AC voltage of AC power supply AC is applied between input nodes N1 and N2.

Figure 19:
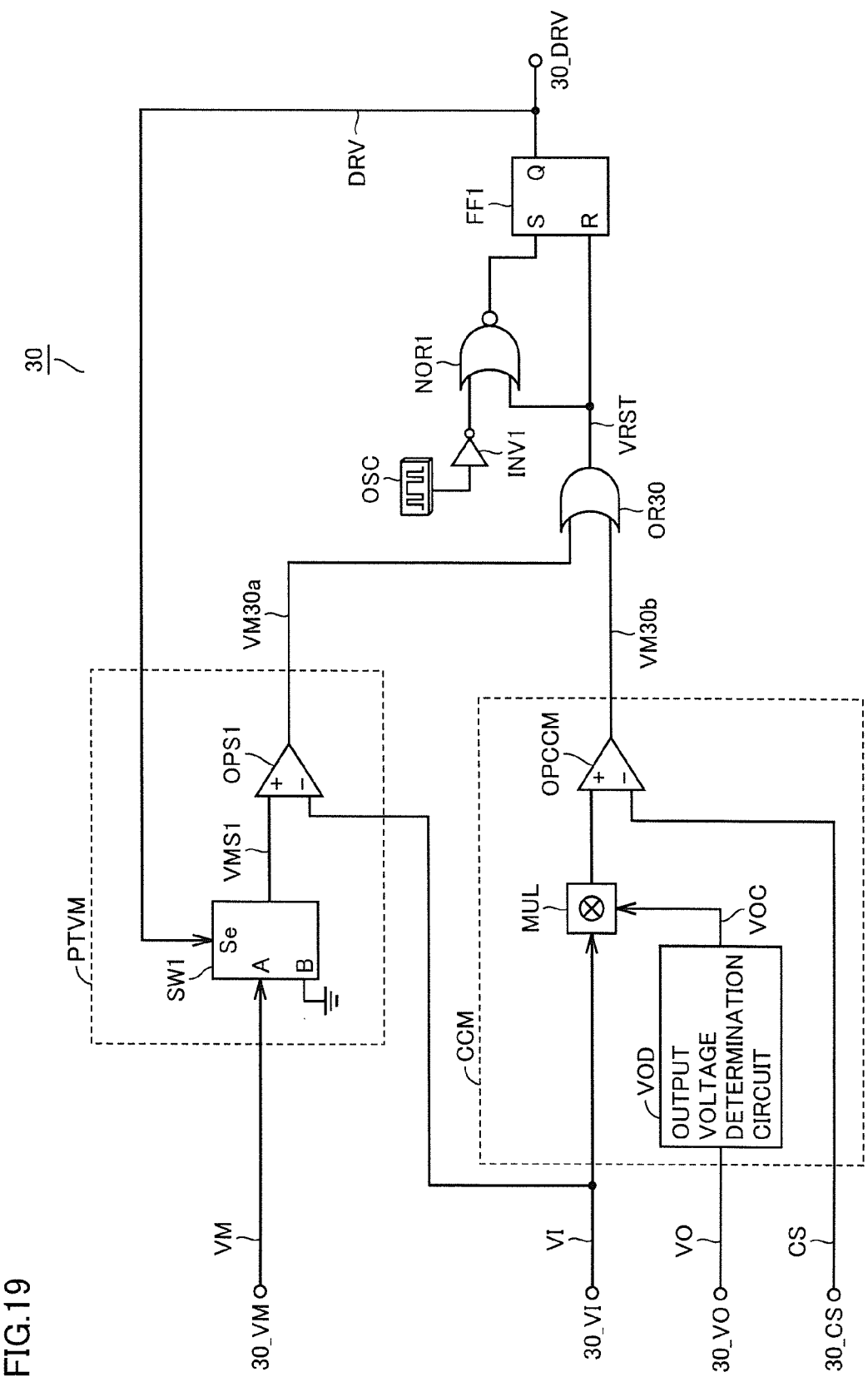
FIG. 19 is a circuit diagram of a control circuit according to the third embodiment of the present invention.

A circuit diagram of control circuit 30 according to the third embodiment of the present invention will be described with reference to FIG. 19.

Control circuit 30 has, as components, first protection circuit PTVM, a two-input OR circuit OR30, oscillator OSC, inverter INV1, two-input NOR circuit NOR1, drive signal output circuit FF1, and a continuous-current-mode power factor improvement circuit CCM. The components other than first protection circuit PTVM and continuous-current-mode power factor improvement circuit CCM are the same as the configurations to which the same reference characters are assigned in FIG. 3 and the like, and thus, description of the configurations and functions will not be repeated.

Midpoint potential VM showing the potential of midpoint terminal M of cascode element CAS is applied to input terminal A of switch SW1 included in first protection circuit PTVM. Midpoint potential VM of cascode element CAS that is in the conductive state in accordance with drive signal DRV is a voltage determined by a product of drain current Id flowing through drain terminal D of cascode element CAS and the on resistance of normally-off type transistor Tr_noff. Midpoint potential VM is outputted from switch SW1 as midpoint-source voltage VMS1 and is compared with input voltage monitor signal VI by comparator OPS1. When an abnormality occurs at switching power supply circuit 3, a first protection signal VM30a outputted by comparator OPS1 changes from the low level to the high level and brings cascode element CAS out of conduction.

First protection circuit PTVM differs from first protection circuit PTVM in FIG. 3 in that a reference of comparator OPS1 is used as input voltage monitor signal VI. Input voltage monitor signal VI is information about a full-wave rectification sinusoidal wave of the input voltage. In other words, input voltage monitor signal VI is for ideally sensing the abnormal state in line with the voltage state of the AC power supply phase.

In order to improve a power factor of AC power supply AC that is an input to switching power supply circuit 3, it is necessary to substantially match a waveform of a voltage of AC power supply AC and a waveform of a current flowing through AC power supply AC. Thus, when input voltage monitor signal VI is close to zero, the on time of cascode element CAS is shortened to reduce the current flowing through coil L. On the other hand, when input voltage monitor signal VI is large (in the case of 100 Vrms in Japan, a peak is substantially 140 V), the on time of cascode element CAS is prolonged. Therefore, determination of a current value in the abnormal state changes in accordance with the phase of AC power supply AC. By using the reference of comparator OPS1 as input voltage monitor signal VI, an abnormal voltage can be ideally detected.

Continuous-current-mode power factor improvement circuit CCM has output voltage determination circuit VOD, multiplication circuit MUL and a comparator OPCCM. Output voltage determination circuit VOD compares output voltage monitor signal VO and a reference power supply Vref_VO, and outputs output voltage control signal VOC having binary values. Multiplication circuit MUL performs multiplication of this output voltage control signal VOC and input voltage monitor signal VI, and outputs a result of multiplication to comparator OPCCM.

The output of multiplication circuit MUL includes two types of information, that is, information about how much error the current output voltage of switching power supply circuit 3 has with respect to the intrinsic rated output voltage (how low the voltage is with respect to the rated voltage) and information about how much current must be flown to improve the power factor. Comparator OPCCM compares the output of multiplication circuit MUL and power supply current signal CS outputted from sense resistor RS, and outputs a first power factor control signal VM30*b*.

As described above, the current flowing through coil L takes the current waveform corresponding to the voltage waveform of AC power supply AC, and as a result, the power factor is improved.

In response to first power factor control signal VM30*b*, drive signal output circuit FF1 controls the conduction state of cascode element CAS such that the current waveform of coil L (FIG. 18) substantially matches the current waveform of AC power supply AC, that is, such that the power factor approaches 1. First power factor control signal VM30*b* and first protection signal VM30*a* are inputted to two-input OR circuit OR30, and an output thereof is inputted to reset terminal R of drive signal output circuit FF1. Therefore, when an abnormality such as saturation of the coil or load short circuit occurs at switching power supply circuit 3 including continuous-current-mode power factor improvement circuit CCM, cascode element CAS is brought out of conduction in response to first protection signal VM30*a*, and crashing of the system is prevented.

As described above, the embodiment of the present invention is also suitable for the boosting converter equipped with the power factor improvement function.

<<Fourth Embodiment>>

A circuit diagram of a switching power supply circuit 4 according to a fourth embodiment of the present invention will be described with reference to FIG. 20.

Switching power supply circuit 4 is a boosting converter including a critical-current-mode power factor improvement circuit. The critical mode refers to the operation of turning cascode element CAS on at a timing when a current becomes substantially zero. In this mode, the switching cycle obtained by adding the on time and the off time of cascode element CAS changes in accordance with a voltage value of the full-wave rectification sinusoidal wave of AC power supply AC. In the switching power supply circuits described with reference to FIGS. 1, 3 and the like, a timing of turning cascode element CAS on is generated at a fixed timing based on oscillator OSC, and thus, the switching cycle is fixed. In the embodiment of the present invention, however, the cycle is variable. The embodiment of the present invention is also suitable in the case of such a variable cycle and variable frequency.

Switching power supply circuit 4 is the same as switching power supply circuit 2*a* according to the first modification of the second embodiment shown in FIG. 15 except for the following points. Switching power supply circuit 4 includes a current detection coil Ld detecting a current of coil L. Coil L and current detection coil Ld have a trans relationship, and a copy of the operation of causing the current to flow through coil L is taken out from current detection coil Ld by magnetic coupling. A zero current detection signal ZCD is outputted from one terminal of current detection coil Ld. The other terminal of current detection coil Ld is connected to a lower-potential-side power supply wiring (ground level).

Furthermore, unlike control circuit 21 shown in FIG. 15, zero current detection signal ZCD is inputted to an input terminal 40_ZCD of a control circuit 40.

Figure 20:
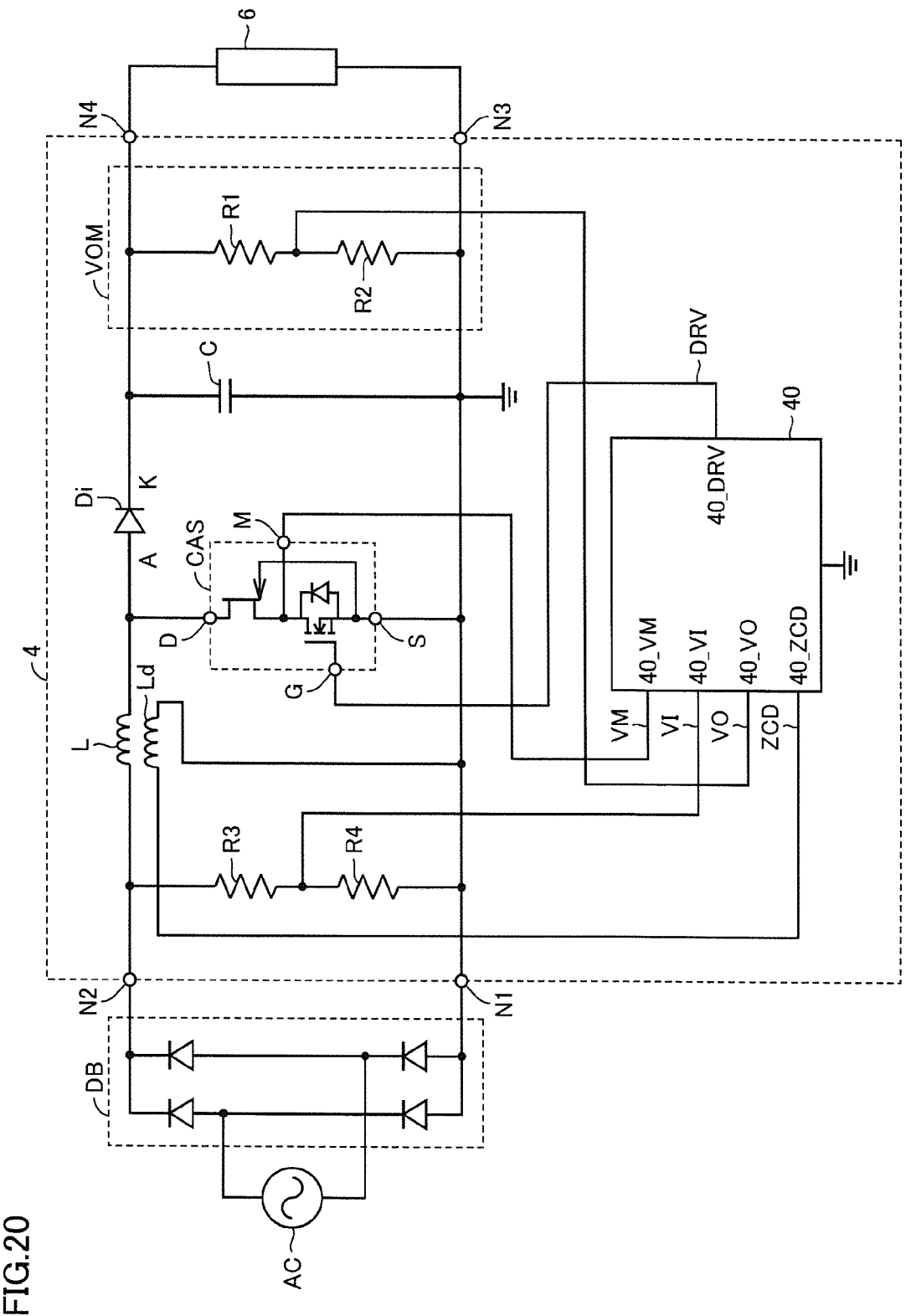
FIG. 20 is a circuit diagram of a switching power supply circuit according to a fourth embodiment of the present invention.

Diode bridge DB is connected between input node N1 and input node N2 of switching power supply circuit 4 shown in FIG. 20, and the sinusoidal voltage obtained by full-wave rectification of the AC voltage of AC power supply AC is applied between input nodes N1 and N2.

Figure 21:
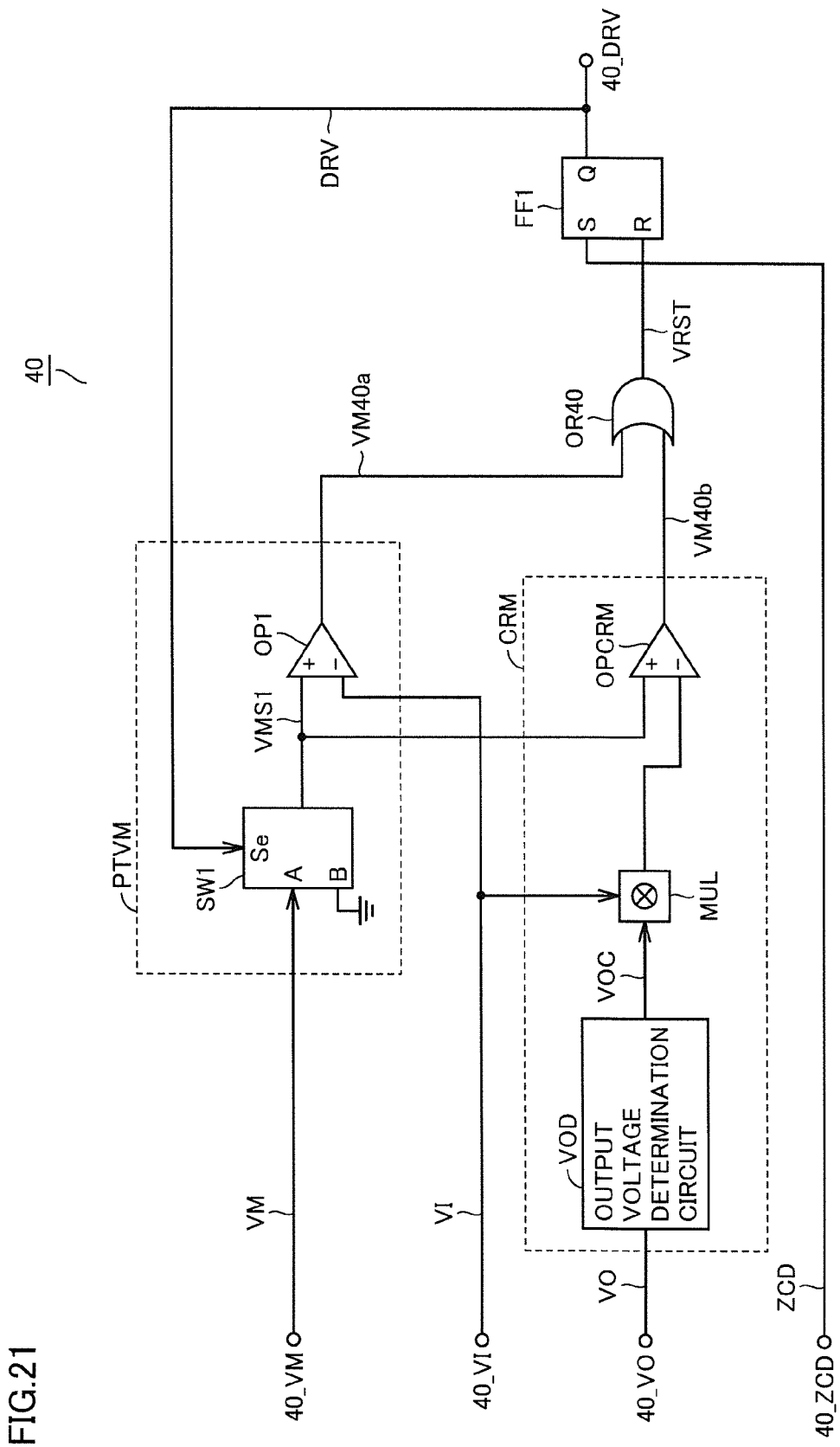
FIG. 21 is a circuit diagram of a control circuit according to the fourth embodiment of the present invention.

A circuit diagram of control circuit 40 according to the fourth embodiment of the present invention will be described with reference to FIG. 21.

Control circuit 40 includes first protection circuit PTVM, a two-input OR circuit OR40, drive signal output circuit FF1, and a critical-current-mode power factor improvement circuit CRM. The components other than critical-current-mode power factor improvement circuit CRM are the same as the configurations to which the same reference characters are assigned in FIG. 3 and the like, and thus, description of the configurations and functions will not be repeated.

Midpoint potential VM showing the potential of midpoint terminal M of cascode element CAS is applied to the input terminal of switch SW1 included in first protection circuit PTVM. Midpoint potential VM of cascode element CAS that is in the conductive state in accordance with drive signal DRV is a voltage determined by a product of drain current Id flowing through drain terminal D of cascode element CAS and the on resistance of normally-off type transistor Tr_noff.

Midpoint potential VM is outputted from switch SW1 as midpoint-source voltage VMS1 and is compared with input voltage monitor signal VI by comparator OP1. When an abnormality occurs at switching power supply circuit 4, a first protection signal VM40*a* outputted by comparator OP1 changes from the low level to the high level and brings cascode element CAS out of conduction.

Comparator OP1 of first protection circuit PTVM in FIG. 3 compares midpoint-source voltage VMS1 and reference power supply Vref1. In contrast, comparator OP1 of first protection circuit PTVM in FIG. 21 compares midpoint-source voltage VMS1 and input voltage monitor signal VI, and outputs first protection signal VM40*a*. The configuration of first protection circuit PTVM shown in FIG. 21 is similar to that of first protection circuit PTVM shown in FIG. 19.

Critical-current-mode power factor improvement circuit CRM has output voltage determination circuit VOD, multiplication circuit MUL and a comparator OPCRM. Output voltage determination circuit VOD compares output voltage monitor signal VO and reference power supply Vref_VO, and outputs output voltage control signal VOC having binary values. Multiplication circuit MUL performs multiplication of this output voltage control signal VOC and input voltage monitor signal VI, and outputs a result of multiplication to comparator OPCRM.

The output of multiplication circuit MUL includes two types of information, that is, information about how much error the current output voltage of switching power supply circuit 4 has with respect to the intrinsic rated output voltage (how low the voltage is with respect to the rated voltage) and information about how much current must be flown to improve the power factor.

Comparator OPCRM compares the output of multiplication circuit MUL and midpoint-source voltage VMS1 outputted from first protection circuit PTVM, and outputs a second power factor control signal VM40$b$. In response to second power factor control signal VM40$b$, drive signal output circuit FF1 controls the conduction state of cascode element CAS such that the current waveform of coil L (FIG. 20) substantially matches the current waveform of AC power supply AC, that is, such that the power factor approaches 1.

When AC power supply AC is substantially 0 V, the period in which cascode element CAS is in the conductive state is short. Therefore, a peak of the current flowing through coil L is reduced. On the other hand, when AC power supply AC is substantially 140 V (obtained by 100*√2 at the peak in the case of 100 Vrms in Japan), the period in which cascode element CAS is in the conductive state is long, and the peak of the current flowing through coil L is relatively larger in current value than that when AC power supply AC is 0 V. With this operation, the voltage of AC power supply AC and the current flowing through AC power supply AC take substantially the same full-wave rectification sinusoidal waveform, and as a result, the power factor is improved.

In response to zero current detection signal ZCD, drive signal output circuit FF1 brings cascode element CAS into conduction after the current of coil L becomes zero. Second power factor control signal VM40$b$ and first protection signal VM40$a$ are inputted to two-input OR circuit OR40, and an output thereof is inputted to reset terminal R of drive signal output circuit FF1.

During the normal operation of switching power supply circuit 4, cascode element CAS is turned off at a timing determined by second power factor control signal VM40$b$ generated based on input voltage monitor signal VI and output voltage monitor signal VO. Therefore, the current of coil L is controlled by the voltage waveform of AC power supply AC and is also controlled by an error of the output voltage detected by output voltage monitor circuit VOM (difference with the regular output voltage). With this operation, the power factor of the input is improved and the voltage of the output is kept constant.

On the other hand, when switching power supply circuit 4 is abnormal (e.g., saturation of coil L, short circuit in load 6 or the like occurs), cascode element CAS is brought out of conduction in response to first protection signal VM40$a$, and crashing of the system is prevented.

As described above, in the embodiment of the present application, by using midpoint potential VM of cascode element CAS, the power factor improvement operation and the protection operation in the abnormal state can be obtained. The protection operation in accordance with first protection signal VM40$a$ is controlled by the reference voltage optimized by input voltage monitor signal VI. Because the power factor improvement operation is performed, the peak value of the current flowing through coil L changes in accordance with the voltage of AC power supply AC. Therefore, by using the reference voltage as input voltage monitor signal VI, an abnormal current can be ideally detected.

<<Fifth Embodiment>>

Figure 22:
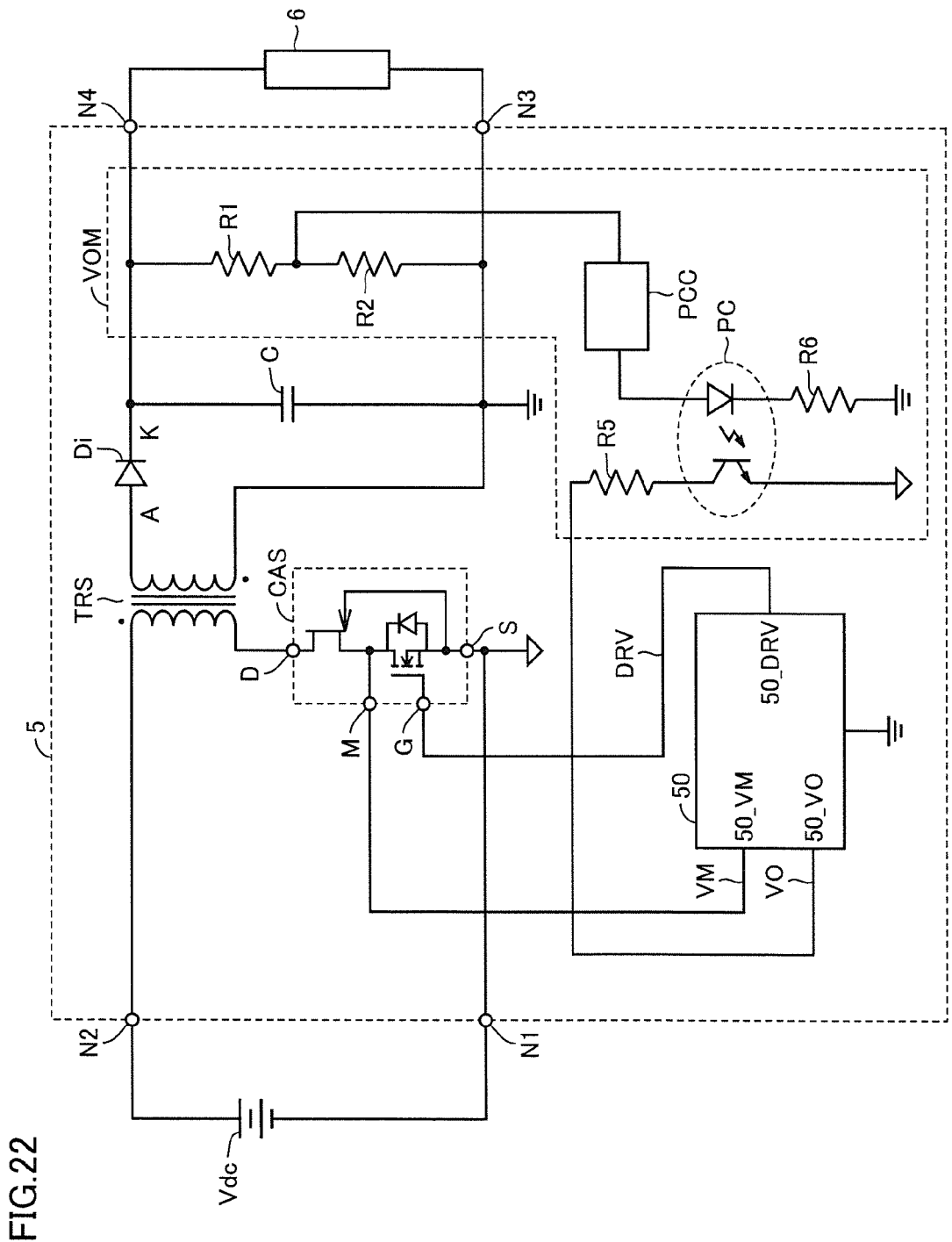
FIG. 22 is a circuit diagram of a switching power supply circuit according to a fifth embodiment of the present invention.

A circuit diagram of a switching power supply circuit 5 according to a fifth embodiment of the present invention will be described with reference to FIG. 22.

Switching power supply circuit 5 is an insulation type flyback converter. Switching power supply circuit 5 includes input node N1, input node N2, output node N3, output node N4, a transformer TRS, cascode element CAS, diode Di, capacitor C, output voltage monitor circuit VOM, and a control circuit 50. As one example, switching power supply circuit 5 steps down DC input voltage Vdc of 40 V applied between input nodes N1 and N2, and generates a DC output voltage of 3 V between output nodes N3 and N4. It should be noted that a commercial AC power supply may be connected in some cases between input nodes N1 and N2, with a diode bridge and a line filter interposed therebetween.

DC input voltage Vdc is applied between input nodes N1 and N2, and load 6 is connected between output nodes N3 and N4. Input node N2 and a diode terminal D of cascode element CAS are connected to one terminal and the other terminal of a primary-side coil of transformer TRS, respectively. Input node N1 is connected to source terminal S of cascode element CAS. Anode A of diode Di and output node N3 are connected to one terminal and the other terminal of a secondary-side coil of transformer TRS, respectively. Output node N4 is connected to cathode K of diode Di. Capacitor C is connected between output nodes N3 and N4.

Output voltage monitor circuit VOM has resistor R1 and resistor R2 serially connected between output nodes N3 and N4, a photo coupler control circuit PCC, a photo coupler PC, a resistor R5, and a resistor R6. Photo coupler control circuit PCC introduces, into photo coupler PC, a current corresponding to the DC output voltage divided by resistors R1 and R2. Photo coupler PC converts an output current of photo coupler PC into output voltage monitor signal VO using resistor R5, and outputs output voltage monitor signal VO.

Control circuit 50 has an input terminal 50_VM to which midpoint potential VM of midpoint terminal M of cascode element CAS is inputted, an input terminal 50_VO to which output voltage monitor signal VO generated by output voltage monitor circuit VOM is inputted, and an output terminal 50_DRV that outputs drive signal DRV to gate terminal G of cascode element CAS.

A circuit diagram of control circuit 50 according to the fifth embodiment of the present invention will be described with reference to FIG. 23.

Control circuit 50 has first protection circuit PTVM, output voltage determination circuit VOD, a two-input OR circuit OR50, oscillator OSC, inverter INV1, two-input NOR circuit NOR1, and drive signal output circuit FF1. In control circuit 50 and control circuit 10 according to the first embodiment shown in FIG. 3, the components to which the same reference characters are assigned have the same configurations and functions. Therefore, description of these components will not be repeated. It should be noted that two-input OR circuit OR10 in control circuit 10 shown in FIG. 3 and two-input OR circuit OR50 in control circuit 50 have the same function.

<Operation in Normal State>

Figure 24:
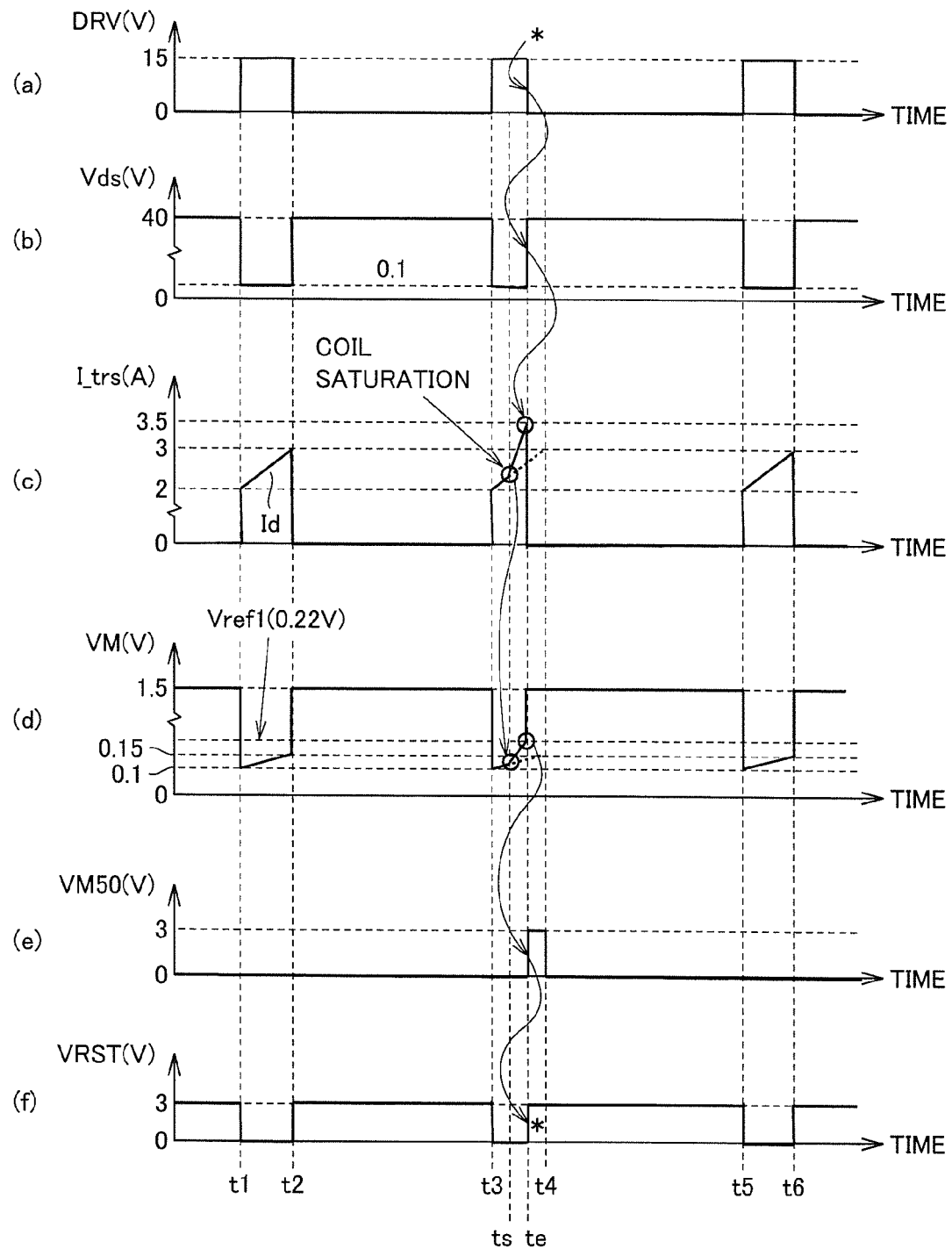
FIG. 24 is a timing chart showing the operation of the control circuit according to the fifth embodiment of the present invention.

The operation of control circuit 50 according to the fifth embodiment of the present invention will be described with reference to FIG. 24.

As shown in FIG. 24(a), during the period from time t1 to time t2, control circuit 50 outputs drive signal DRV of 15 V to gate terminal G of cascode element CAS. During this period, drive signal DRV is set from the low level to the high level by oscillator OSC at regular time intervals. On the other hand, during the period from time t2 to time t3, drive signal DRV shifts to the low level in accordance with output voltage control signal VOC shown in FIG. 23 such that the DC output voltage becomes constant.

As shown in FIGS. 24(b) and 24(c), during the period from time t1 to time t2, cascode element CAS is brought into conduction and a current I_trs of the primary-side coil of transformer TRS increases from 2 A to 3 A. In FIG. 22, black points of two windings of transformer TRS refer to having the same polarity. Therefore, in the secondary-side coil, a negative voltage is generated at this time on the anode A side of diode Di and the current flow is blocked by diode Di. Current I_trs of the primary-side coil of transformer TRS is stored in a magnetic body (core) of the transformer as magnetic energy.

During the period from time t2 to time t3, cascode element CAS shifts to the non-conductive state and current I_trs of the primary-side coil of transformer TRS becomes zero. At this time, in the secondary-side coil of transformer TRS, a positive voltage is generated on the anode A side of diode Di and the stored energy is released through diode Di to capacitor C.

As shown in FIGS. 24(d) and 24(e), midpoint potential VM of cascode element CAS (drain-source voltage of normally-off type transistor Tr_noff), which has been brought into conduction at time t1, decreases from 1.5 V to 0.1 V. Before time t1, cascode element CAS is in the non-conductive state, and thus, midpoint potential VM has a value increased by the threshold voltage of normally-on type transistor Tr_non with respect to the potential of source terminal S. At time t2, voltage drop occurs at the on resistance of the normally-off type transistor in accordance with increased drain current Id of the cascode element, and midpoint potential VM increases to approximately 0.15 V. Midpoint potential VM during the period from time t2 to time t3 returns again to the value before time t1.

Figure 23:
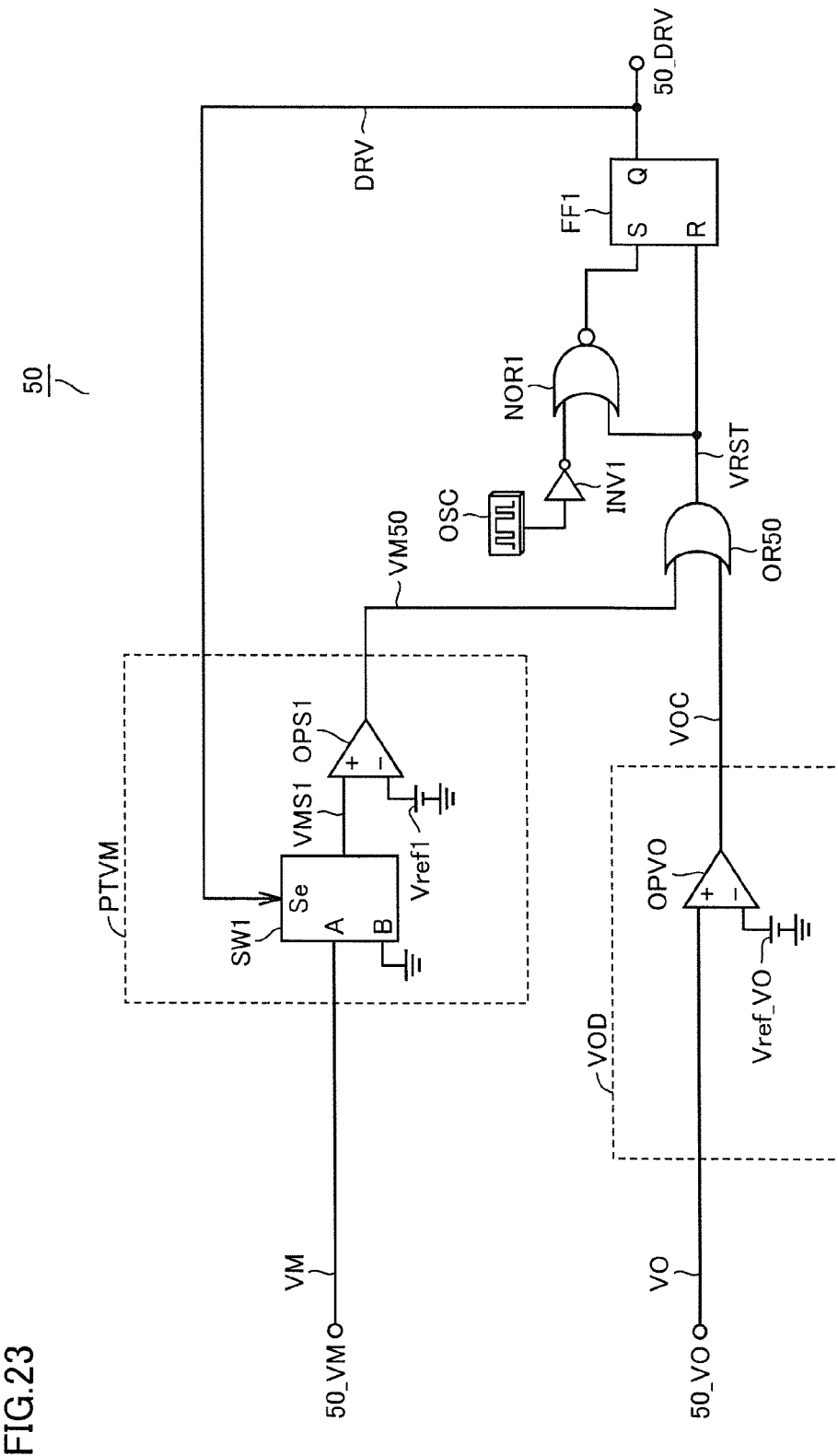
FIG. 23 is a circuit diagram of a control circuit according to the fifth embodiment of the present invention.

As shown in FIG. 23, during the period from time t1 to time t2 in which the drive signal is in the high level, first protection circuit PTVM compares midpoint potential VM selected by switch SW1 and reference power supply Vref1. Similarly, during the period from time t2 to time t3 in which the drive signal is in the low level, the ground level selected by switch SW1 is compared with reference power supply Vref1. Since the output of switch SW1 never exceeds reference power supply Vref1 at any of time t1 to time t3, a first protection signal VM50 is maintained in the low level.

As shown in FIG. 24(f), during the period from time t1 to time t2, drive reset signal VRST is maintained in the low level. This is because output voltage control signal VOC shown in FIG. 23 is maintained in the low level during this period. During the period from time t2 to time t3, drive reset signal VRST shifts to the high level. This is because output voltage monitor signal VO exceeds reference power supply Vref_VO, and thus, output voltage control signal VOC shifts to the high level.

<Operation when Abnormality is Detected>

As shown in FIGS. 24(c), 24(d), 24(e), and 24(f), a case is assumed where the primary-side coil of transformer TRS is saturated at time ts during the period in which cascode element CAS is in the conductive state, which starts at time t3. Current I_trs of the primary-side coil increases sharply after time ts, and as a result, midpoint potential VM exceeds the value of reference power supply Vref1 at time te. Then, first protection circuit PTVM shifts first protection signal VM50 from the low level to the high level, and drive reset signal VRST changes from the low level to the high level.

As shown in FIGS. 24(a), 24(b) and 24(c), drive signal output circuit FF1 changes drive signal DRV from the high level to the low level and shifts cascode element CAS from the conductive state to the non-conductive state at time te. As a result, the value of current I_trs of the primary-side coil decreases sharply toward zero.

As described above, when an abnormality occurs at switching power supply circuit 5 configured as the flyback converter, quick abnormality detection and protection of switching power supply circuit 5 are achieved by drive signal DRV outputted by control circuit 50 in response to midpoint potential VM outputted by cascode element CAS.

Even if switching power supply circuit 5 is a non-insulation type converter, switching power supply circuit 5 has a configuration similar to that according to the fifth embodiment. In the case of the non-insulation type converter, photo coupler PC may be removed and output voltage monitor signal VO generated by output voltage monitor circuit VOM may be transmitted to control circuit 50.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A switching power supply device, comprising:
a pair of input nodes to which an input voltage is applied;
a pair of output nodes from which an output voltage is outputted;
a coil and a cascode element serially connected between said pair of input nodes or between a higher-potential-side input node of said pair of input nodes and a higher-potential-side output node of said pair of output nodes; and
a control circuit outputting a drive signal that controls a conduction state of said cascode element, wherein
said cascode element includes a normally-on type transistor and a normally-off type transistor that are cascode-connected, a midpoint terminal to which a source of said normally-on type transistor and a drain of said normally-off type transistor are connected, a drain terminal to which a drain of said normally-on type transistor is connected, a gate terminal to which a gate of said normally-off type transistor is connected and which receives said drive signal, and a source terminal to which a gate of said normally-on type transistor and a source of said normally-off type transistor are connected,
said cascode element is controlled to be in a conductive state when said drive signal is in a first state, and is controlled to be in a non-conductive state when said drive signal is in a second state, and
said control circuit includes:
a signal generation circuit outputting a first signal for changing said drive signal from said second state to said first state;
an output voltage determination circuit outputting a second signal for changing said drive signal from said first state to said second state when said output voltage exceeds a target voltage;

a first protection circuit outputting a first protection signal for changing said drive signal from said first state to said second state in response to an event that a midpoint voltage, which is a voltage between said midpoint terminal and said source terminal, has exceeded a first reference voltage during a period in which said drive signal is in said first state; and a drive signal output circuit generating said drive signal based on said first signal, said second signal and said first protection signal.

2. The switching power supply device according to claim 1, wherein said control circuit further includes a second protection circuit, said second protection circuit outputs a second protection signal for changing said drive signal from said first state to said second state in response to an event that said midpoint voltage has exceeded a second reference voltage during a period in which said drive signal is in said second state, and said drive signal output circuit generates said drive signal based on said first signal, said second signal, said first protection signal, and said second protection signal.

3. The switching power supply device according to claim 2, wherein said control circuit further includes a hold circuit retaining said first protection signal or said second protection signal for a predetermined time.

4. The switching power supply device according to claim 1, wherein said control circuit further includes a hold circuit retaining said first protection signal or said second protection signal for a predetermined time.

5. The switching power supply device according to claim 1, wherein said drain terminal is connected to the higher-potential-side input node of said pair of input nodes, said source terminal is connected to one terminal of said coil, and the other terminal of said coil is connected to the higher-potential-side output node of said pair of output nodes, the switching power supply device further comprising:

a diode having a cathode connected to the one terminal of said coil and an anode connected to a lower-potential-side output node of said pair of output nodes; and a capacitor connected between the other terminal of said coil and the lower-potential-side output node of said pair of output nodes.

6. The switching power supply device according to claim 5, wherein said control circuit further includes:

an output voltage monitor circuit generating an output voltage monitor signal based on said output voltage;

a clip circuit outputting a clip voltage obtained by clipping said midpoint potential voltage to a predetermined value;

a multiplication circuit multiplying said clip voltage and said output voltage monitor signal; and a third protection circuit outputting a third protection signal for changing said drive signal from said first state to said second state in response to an event that an output voltage of said multiplication circuit has exceeded a third reference voltage, and said drive signal output circuit generates said drive signal based on said first signal, said second signal, said first protection signal, and said third protection signal.

7. The switching power supply device according to claim 6, wherein said input voltage is a DC voltage applied to the higher-potential-side input node of said pair of input nodes with respect to the lower-potential-side input node of said pair of input nodes.

8. The switching power supply device according to claim 5, wherein said control circuit further includes:

an input voltage monitor circuit generating an input voltage monitor signal based on said input voltage;

an averaging circuit outputting an average midpoint voltage obtained by averaging said midpoint voltage during a period in which said drive signal is in said first state;

a multiplication circuit multiplying said average midpoint voltage and said input voltage monitor signal; and a fourth protection circuit outputting a fourth protection signal for changing said drive signal from said first state to said second state in response to an event that an output voltage of said multiplication circuit has exceeded a fourth reference voltage, and said drive signal output circuit generates said drive signal based on said first signal, said second signal, said first protection signal, and said fourth protection signal.

9. The switching power supply device according to claim 8, wherein said input voltage is a DC voltage applied to the higher-potential-side input node of said pair of input nodes with respect to the lower-potential-side input node of said pair of input nodes.

10. The switching power supply device according to claim 5, wherein said input voltage is a DC voltage applied to the higher-potential-side input node of said pair of input nodes with respect to the lower-potential-side input node of said pair of input nodes.

11. The switching power supply device according to claim 1, wherein one terminal of said coil is connected to the higher-potential-side input node of said pair of input nodes, the switching power supply device further comprising:

a diode having an anode connected to the other terminal of said coil and a cathode connected to the higher-potential-side output node of said pair of output nodes; and a capacitor connected between said pair of output nodes, wherein said drain terminal and said source terminal are connected to the other terminal of said coil and a lower-potential-side input node of said pair of input nodes, respectively.

12. The switching power supply device according to claim 11, wherein said control circuit further includes:

an input voltage monitor circuit generating an input voltage monitor signal based on said input voltage;

a clip circuit outputting a midpoint clip voltage obtained by clipping said midpoint voltage to a predetermined value;

a multiplication circuit multiplying said midpoint clip voltage and said input voltage monitor signal; and a fifth protection circuit outputting a fifth protection signal for changing said drive signal from said first state to said second state in response to an event that an output voltage of said multiplication circuit has exceeded a fifth reference voltage, and said drive signal output circuit generates said drive signal based on said first signal, said second signal, said first protection signal, and said fifth protection signal.

13. The switching power supply device according to claim 11, wherein
said input voltage is a DC voltage applied to the higher-potential-side input node of said pair of input nodes with respect to the lower-potential-side input node of said pair of input nodes.

14. The switching power supply device according to claim 1, wherein
said input voltage obtained by full-wave rectification of an AC voltage is applied to the higher-potential-side input node of said pair of input nodes with respect to a lower-potential-side input node of said pair of input nodes, and
one terminal of said coil is connected to said higher-potential-side input node,
the switching power supply device further comprising:
a diode having an anode connected to the other terminal of said coil and a cathode connected to the higher-potential-side output node of said pair of output nodes; and
a capacitor connected between said pair of output nodes, wherein
said drain terminal and said source terminal are electrically connected to the other terminal of said coil and said lower-potential-side input node, respectively,
the switching power supply device further comprising:
a sense resistor connected between said lower-potential-side input node and a lower-potential-side output node, and generating a power supply current signal obtained by converting a current value flowing to said lower-potential-side input node into a voltage value;
an input voltage monitor circuit generating an input voltage monitor signal based on said input voltage; and
a continuous-current-mode power factor improvement circuit improving a power factor of an input current of said higher-potential-side input node and said input voltage based on said power supply current signal, said input voltage monitor signal and said second signal, wherein
said drive signal output circuit generates said drive signal based on said first signal, said first protection signal, and an output signal of said continuous-current-mode power factor improvement circuit.

15. The switching power supply device according to claim 1, wherein
said input voltage obtained by full-wave rectification of an AC voltage is applied to the higher-potential-side input node of said pair of input nodes with respect to a lower-potential-side input node of said pair of input nodes, and
one terminal of said coil is connected to said higher-potential-side input node,
the switching power supply device further comprising:
a diode having an anode connected to the other terminal of said coil and a cathode connected to the higher-potential-side output node of said pair of output nodes; and
a capacitor connected between said pair of output nodes, wherein
said drain terminal and said source terminal are connected to the other terminal of said coil and said lower-potential-side input node, respectively,
said signal generation circuit includes a zero current detection coil detecting a zero current of said coil and generating a zero current detection signal and outputs said zero content detection signal as said first signal,
the switching power supply device further comprising:
an input voltage monitor circuit generating an input voltage monitor signal based on said input voltage; and
a critical-current-mode power factor improvement circuit improving a power factor of an input current of said higher-potential-side input node and said input voltage based on said input voltage monitor signal, said second signal, and said midpoint voltage during a period in which said drive signal is in said first state, wherein
said drive signal output circuit generates said drive signal from based on said first signal, said first protection signal, and an output signal of said critical-current-mode power factor improvement circuit.

16. The switching power supply device according to claim 1, wherein
said coil is a transformer,
one terminal on a primary side of said transformer is connected to the higher-potential-side input node of said pair of input nodes, and
said drain terminal and said source terminal are connected to the other terminal on the primary side of said transformer and a lower-potential-side input node of said pair of input nodes, respectively,
the switching power supply device further comprising:
a diode having an anode connected to one terminal on a secondary side of said transformer and a cathode connected to the higher-potential-side output node of said pair of output nodes; and
a capacitor connected between said pair of output nodes.

* * * * *